United States Patent
Keith, Jr. et al.

(10) Patent No.: US 12,445,305 B2
(45) Date of Patent: *Oct. 14, 2025

(54) AUTHENTICATION PROCESS

(71) Applicant: WINKK, INC, Menlo Park, CA (US)

(72) Inventors: Robert O. Keith, Jr., San Jose, CA (US); Rustam Islamov, South Lake Tahoe, CA (US); Roustem Akhiarov, Menlo Park, CA (US); Maxim Silaev, Windermere Park (AU)

(73) Assignee: Winkk, Inc., Menlo Park, CA (US)

( * ) Notice: Subject to any disclaimer, the term of this patent is extended or adjusted under 35 U.S.C. 154(b) by 108 days.

This patent is subject to a terminal disclaimer.

(21) Appl. No.: 18/371,221

(22) Filed: Sep. 21, 2023

(65) Prior Publication Data

US 2024/0106659 A1 Mar. 28, 2024

Related U.S. Application Data

(60) Provisional application No. 63/408,543, filed on Sep. 21, 2022.

(51) Int. Cl.
*H04L 9/32* (2006.01)
*H04L 9/08* (2006.01)
*H04L 9/30* (2006.01)

(52) U.S. Cl.
CPC .......... *H04L 9/3247* (2013.01); *H04L 9/0825* (2013.01); *H04L 9/0861* (2013.01);
(Continued)

(58) Field of Classification Search
CPC ... H04L 9/3247; H04L 9/0825; H04L 9/0861; H04L 9/30; H04L 9/3213; H04L 9/3236; H04L 9/3093
See application file for complete search history.

(56) References Cited

U.S. PATENT DOCUMENTS 1,164,062 A 12/1915 Belcher
5,581,615 A 12/1996 Stern
(Continued)

FOREIGN PATENT DOCUMENTS

CN 107169374 B 9/2017
CN 107918790 A 4/2018
(Continued)

OTHER PUBLICATIONS

Tao et al., "Simple Matrix—A Multivariate Public Key Cryptosystem (MPKC) for Encryption" from Finite Field and Their Applications vol. 35, Sep. 2015, pp. 352-368 (Year 2015).
(Continued)

*Primary Examiner* — Darren B Schwartz
(74) *Attorney, Agent, or Firm* — Haverstock & Owens, A Law Corporation

(57) ABSTRACT

Digital signatures using the Diophantine system of equations are implemented. A digital signature is an authentication mechanism that enables the creator of a message to attach a code that acts as a signature. A digital signature scheme typically includes three algorithms: a key generation algorithm, a signing algorithm, and a signature verifying algorithm. The key generation algorithm selects a private key uniformly at random from a set of possible private keys. The key generation algorithm outputs the private key and a corresponding public key. The signing algorithm produces a signature given a message and a private key. The signature verifying algorithm either accepts or rejects a message's claim to authenticity based at least in part on the message, the public key, and the signature.

18 Claims, 7 Drawing Sheets

(52) U.S. Cl.
CPC .............. *H04L 9/30* (2013.01); *H04L 9/3213* (2013.01); *H04L 9/3236* (2013.01)

(56) References Cited

U.S. PATENT DOCUMENTS

| | | |
|---|---|---|
| 5,850,444 A | 12/1998 | Rune |
| 5,966,444 A * | 10/1999 | Yuan .................... H04L 9/0838 |
| | | 380/283 |
| 5,987,130 A | 11/1999 | Chang |
| 6,446,207 B1 * | 9/2002 | Vanstone .............. H04L 9/3066 |
| | | 713/180 |
| 6,895,506 B1 | 5/2005 | Abu-Husein |
| 6,947,943 B2 | 9/2005 | DeAnna |
| 7,100,051 B1 * | 8/2006 | Kipnis .................. H04L 9/3093 |
| | | 713/168 |
| 7,167,565 B2 | 1/2007 | Rajasekaran |
| 7,468,927 B1 | 12/2008 | Battista |
| 7,562,028 B1 | 7/2009 | Donner |
| 7,571,320 B2 | 8/2009 | Davis |
| D607,009 S | 12/2009 | McEnaney |
| 7,683,773 B1 | 3/2010 | Goodall |
| D614,192 S | 4/2010 | Takani |
| 7,885,635 B2 | 2/2011 | Laursen |
| 7,925,013 B1 | 4/2011 | Washington |
| 7,992,102 B1 | 8/2011 | De Angelo |
| 7,992,190 B2 | 8/2011 | Mevissen |
| 8,139,581 B1 | 3/2012 | Mraz |
| 8,161,463 B2 | 4/2012 | Johnson |
| 8,218,762 B2 | 7/2012 | Itoh |
| 8,363,259 B2 | 1/2013 | Gillboa |
| 8,417,642 B2 | 4/2013 | Oren |
| 8,417,643 B2 | 4/2013 | Mardikar |
| 8,543,834 B1 | 9/2013 | Barra |
| 8,543,884 B2 | 9/2013 | Mansour |
| 8,621,209 B1 | 12/2013 | Johansson |
| 8,639,785 B2 | 1/2014 | Kiley |
| 8,892,871 B2 | 11/2014 | Cho |
| D719,176 S | 12/2014 | Cohen |
| D719,177 S | 12/2014 | Cohen |
| D723,050 S | 2/2015 | Minsung et al. |
| 8,959,579 B2 | 2/2015 | Barton |
| 9,112,835 B2 | 8/2015 | Izozaki |
| 9,210,156 B1 | 12/2015 | Little |
| 9,219,732 B2 | 12/2015 | Baghdassaryan |
| 9,225,695 B1 | 12/2015 | Riera |
| 9,350,539 B2 | 5/2016 | Veugen |
| 9,392,460 B1 | 7/2016 | Blake |
| 9,419,951 B1 | 8/2016 | Felsher et al. |
| D765,669 S | 9/2016 | Shaw |
| 9,485,237 B1 | 11/2016 | Johansson |
| 9,577,992 B2 | 2/2017 | Zizi |
| 9,615,066 B1 | 4/2017 | Tran |
| 9,665,169 B2 | 5/2017 | Dai |
| 9,706,406 B1 | 7/2017 | Adams |
| 9,721,080 B2 | 8/2017 | Moran |
| D800,764 S | 10/2017 | Thoreson |
| 9,825,757 B2 | 11/2017 | Cao |
| 9,854,218 B2 | 12/2017 | Mardikar |
| D813,884 S | 3/2018 | Penker |
| 9,959,694 B2 | 5/2018 | Lindsay |
| 9,961,547 B1 | 5/2018 | Molina-Markham |
| 10,019,561 B1 | 7/2018 | Shelton |
| 10,200,364 B1 | 2/2019 | Ketharaju et al. |
| 10,257,229 B1 | 4/2019 | Kuo |
| D847,857 S | 5/2019 | Elatta |
| 10,322,728 B1 | 6/2019 | Porikli |
| 10,374,800 B1 | 8/2019 | Sharfi |
| 10,380,333 B1 | 8/2019 | Moran |
| 10,402,800 B2 | 9/2019 | Lucas |
| 10,404,458 B1 | 9/2019 | Yamada |
| 10,430,789 B1 | 10/2019 | Herald, Jr. |
| 10,432,605 B1 | 10/2019 | Lester |
| 10,437,975 B1 | 10/2019 | Shelton |
| 10,452,897 B1 | 10/2019 | Benkreira |
| 10,453,562 B2 | 10/2019 | Moloney-Egnatios |
| 10,467,401 B2 | 11/2019 | Kolagi |
| 10,521,223 B1 | 12/2019 | Bogushefsky, III |
| 10,530,577 B1 | 1/2020 | Pazhoor |
| 10,559,307 B1 | 2/2020 | Khalegi |
| 10,630,467 B1 | 4/2020 | Gilbert |
| 10,674,446 B1 | 6/2020 | Trent |
| 10,713,965 B2 | 7/2020 | Cosyn |
| 10,762,406 B2 | 9/2020 | Cash |
| 10,769,633 B2 | 9/2020 | Dua |
| 10,810,290 B2 | 10/2020 | Minter et al. |
| 10,824,703 B1 | 11/2020 | Desai |
| 10,867,021 B1 | 12/2020 | Shelton |
| 10,887,307 B1 | 1/2021 | Newstadt |
| 10,911,425 B1 | 2/2021 | Hitchcock |
| 10,936,744 B1 | 3/2021 | Trepetin |
| 10,958,424 B1 | 3/2021 | Chhabra |
| D916,890 S | 4/2021 | Nagpal |
| 10,970,607 B2 | 4/2021 | Xue |
| 11,005,839 B1 | 5/2021 | Shahidzadeh |
| 11,030,618 B1 | 6/2021 | Budko |
| 11,038,694 B1 | 6/2021 | Kleinman |
| D925,602 S | 7/2021 | Xu |
| 11,056,242 B1 | 7/2021 | Jain |
| D928,803 S | 8/2021 | Faller |
| D928,820 S | 8/2021 | Bodduluri |
| 11,121,878 B2 | 9/2021 | McCarty |
| D942,469 S | 2/2022 | Abdullah et al. |
| 11,256,791 B2 | 2/2022 | Douglas |
| 11,281,553 B1 | 3/2022 | Jain |
| 11,283,835 B1 | 3/2022 | Gordon |
| 11,305,110 B2 | 4/2022 | Toong |
| 11,328,042 B2 | 5/2022 | Keith, Jr. |
| 11,342,051 B1 | 5/2022 | Jain |
| 11,510,172 B2 | 11/2022 | Feng |
| 11,553,337 B2 | 1/2023 | Keith, Jr. |
| 11,563,582 B2 | 1/2023 | Keith, Jr. |
| 11,574,045 B2 | 2/2023 | Keith, Jr. |
| 11,587,650 B2 | 2/2023 | Power |
| 11,588,794 B2 | 2/2023 | Keith, Jr. |
| 11,610,012 B1 | 3/2023 | Della Maggiora |
| 11,637,694 B2 | 4/2023 | Islamov |
| 11,652,815 B2 | 5/2023 | Keith, Jr. |
| 11,657,140 B2 | 5/2023 | Keith, Jr. |
| 11,766,213 B1 | 9/2023 | Kahn |
| 2002/0099955 A1 | 7/2002 | Peled et al. |
| 2002/0114454 A1 | 8/2002 | Hamilton |
| 2002/0131592 A1 | 9/2002 | Hinnant |
| 2002/0169871 A1 | 11/2002 | Cravo de Almeida |
| 2002/0186688 A1 | 12/2002 | Inoue |
| 2003/0014750 A1 | 1/2003 | Kamen |
| 2003/0016844 A1 | 1/2003 | Numaoka |
| 2003/0021416 A1 | 1/2003 | Brown |
| 2003/0147267 A1 | 8/2003 | Huttunen |
| 2003/0174067 A1 | 9/2003 | Soliman |
| 2003/0221030 A1 | 11/2003 | Pontius |
| 2004/0151309 A1 * | 8/2004 | Gentry .................. H04L 9/3093 |
| | | 713/176 |
| 2004/0198392 A1 | 10/2004 | Harvey |
| 2004/0223616 A1 | 11/2004 | Kocarev |
| 2005/0084114 A1 | 4/2005 | Jung |
| 2005/0135609 A1 | 6/2005 | Lee |
| 2005/0147240 A1 | 7/2005 | Agrawal |
| 2005/0210260 A1 * | 9/2005 | Venkatesan ........... H04L 9/0643 |
| | | 713/180 |
| 2006/0031301 A1 | 2/2006 | Herz et al. |
| 2006/0075060 A1 | 4/2006 | Clark |
| 2006/0196950 A1 | 9/2006 | Killccote |
| 2006/0210067 A1 * | 9/2006 | Vedula .................. H04L 9/3271 |
| | | 380/28 |
| 2006/0236408 A1 | 10/2006 | Yan |
| 2006/0282681 A1 | 12/2006 | Scheidt |
| 2006/0285544 A1 | 12/2006 | Taylor |
| 2007/0086653 A1 | 4/2007 | Javidi |
| 2007/0185718 A1 | 8/2007 | DiMambro |
| 2008/0022141 A1 | 1/2008 | Hammarlund |
| 2008/0031460 A1 | 2/2008 | Brookner |
| 2008/0045218 A1 | 2/2008 | Okochi |
| 2008/0080748 A1 | 4/2008 | Sukegawa |
| 2008/0084836 A1 | 4/2008 | Baird |

(56) References Cited

U.S. PATENT DOCUMENTS

| | | |
|---|---|---|
| 2008/0165937 A1 | 7/2008 | Moore |
| 2008/0243014 A1 | 10/2008 | Moussavi |
| 2008/0301057 A1 | 12/2008 | Oren |
| 2009/0006796 A1 | 1/2009 | Chang |
| 2009/0023422 A1 | 1/2009 | MacInnis |
| 2009/0090577 A1 | 4/2009 | Takahashi |
| 2009/0161873 A1 | 6/2009 | Simard |
| 2009/0194592 A1 | 8/2009 | Ming et al. |
| 2009/0279693 A1 | 11/2009 | Billet |
| 2009/0315671 A1 | 12/2009 | Gocho |
| 2009/0327746 A1 | 12/2009 | Greco |
| 2010/0079591 A1 | 4/2010 | Lee |
| 2010/0100716 A1 | 4/2010 | Scott |
| 2010/0122274 A1 | 5/2010 | Gillies |
| 2010/0329232 A1 | 12/2010 | Tubb |
| 2011/0072142 A1 | 3/2011 | Herz et al. |
| 2011/0106935 A1 | 5/2011 | Srinivasan |
| 2011/0135096 A1 | 6/2011 | Rane |
| 2011/0167255 A1 | 7/2011 | Matzkel |
| 2011/0167273 A1 | 7/2011 | Maas |
| 2011/0187642 A1 | 8/2011 | Faith |
| 2011/0194694 A1 | 8/2011 | Struik |
| 2011/0231673 A1 | 9/2011 | Alekseev |
| 2011/0233284 A1 | 9/2011 | Howard |
| 2011/0276952 A1 | 11/2011 | Tyloch |
| 2011/0302405 A1 | 12/2011 | Marlow |
| 2011/0321052 A1 | 12/2011 | Long |
| 2012/0028710 A1 | 2/2012 | Furukawa |
| 2012/0047563 A1 | 2/2012 | Wheeler |
| 2012/0054847 A1 | 3/2012 | Schultz |
| 2012/0067943 A1 | 3/2012 | Saunders |
| 2012/0098750 A1 | 4/2012 | Allen |
| 2012/0127157 A1 | 5/2012 | Adler |
| 2012/0185910 A1 | 7/2012 | Miettinen |
| 2012/0214442 A1 | 8/2012 | Crawford |
| 2012/0221859 A1 | 8/2012 | Marien |
| 2012/0272058 A1 | 10/2012 | Wang et al. |
| 2012/0281885 A1 | 11/2012 | Syrdal |
| 2012/0284602 A1 | 11/2012 | Seed |
| 2012/0330845 A1 | 12/2012 | Kang |
| 2013/0086625 A1 | 4/2013 | Driscoll |
| 2013/0111208 A1 | 5/2013 | Sabin et al. |
| 2013/0170363 A1 | 7/2013 | Millington |
| 2013/0177151 A1 | 7/2013 | Sella |
| 2013/0185779 A1 | 7/2013 | Tamai |
| 2013/0202104 A1 | 8/2013 | Ghouti |
| 2013/0205410 A1 | 8/2013 | Sambamurthy |
| 2013/0219185 A1* | 8/2013 | Sakumo ............... H04L 9/3255 713/176 |
| 2013/0239191 A1 | 9/2013 | Bostick |
| 2013/0243187 A1 | 9/2013 | Hortsmeyer |
| 2013/0304676 A1 | 11/2013 | Gupta |
| 2013/0305324 A1 | 11/2013 | Alford, Jr. |
| 2013/0326224 A1* | 12/2013 | Yavuz .................. H04L 9/3247 713/176 |
| 2013/0346023 A1 | 12/2013 | Novo |
| 2014/0002481 A1 | 1/2014 | Broughton |
| 2014/0007048 A1 | 1/2014 | Qureshi |
| 2014/0013422 A1 | 1/2014 | Janus |
| 2014/0038583 A1 | 2/2014 | Berg |
| 2014/0039892 A1 | 2/2014 | Mills |
| 2014/0040628 A1 | 2/2014 | Fort et al. |
| 2014/0053261 A1 | 2/2014 | Gupta |
| 2014/0064166 A1 | 3/2014 | HomChadhuri |
| 2014/0098723 A1 | 4/2014 | Battista |
| 2014/0108803 A1 | 4/2014 | Probert |
| 2014/0201531 A1 | 7/2014 | Toy |
| 2014/0207724 A1 | 7/2014 | Ledenev |
| 2014/0215222 A1 | 7/2014 | Sakumoto |
| 2014/0244009 A1 | 8/2014 | Mestas |
| 2014/0244514 A1 | 8/2014 | Rodriguez |
| 2014/0244515 A1 | 8/2014 | Garfinkle |
| 2014/0250496 A1 | 9/2014 | Amidon |
| 2014/0266696 A1 | 9/2014 | Addison |
| 2014/0278077 A1 | 9/2014 | Levin |
| 2014/0304371 A1 | 10/2014 | Mraz |
| 2014/0331313 A1 | 11/2014 | Kim |
| 2014/0344455 A1 | 11/2014 | Cheng |
| 2014/0351618 A1 | 11/2014 | Connell |
| 2014/0368601 A1 | 12/2014 | deCharms |
| 2015/0086088 A1 | 3/2015 | King |
| 2015/0089568 A1 | 3/2015 | Sprague |
| 2015/0095352 A1 | 4/2015 | Lacey |
| 2015/0095580 A1 | 4/2015 | Liu |
| 2015/0095648 A1 | 4/2015 | Nix |
| 2015/0095986 A1 | 4/2015 | Karpey |
| 2015/0103136 A1 | 4/2015 | Anderson |
| 2015/0112606 A1 | 4/2015 | He |
| 2015/0113279 A1 | 4/2015 | Andersen |
| 2015/0121524 A1 | 4/2015 | Fawaz |
| 2015/0134963 A1 | 5/2015 | Izu |
| 2015/0142666 A1 | 5/2015 | Landrok |
| 2015/0223731 A1 | 8/2015 | Sahin |
| 2015/0242601 A1 | 8/2015 | Griffiths |
| 2015/0242605 A1 | 8/2015 | Du |
| 2015/0258892 A1 | 9/2015 | Wu |
| 2015/0262067 A1 | 9/2015 | Sridhara |
| 2015/0264569 A1 | 9/2015 | Toyota |
| 2015/0269389 A1 | 9/2015 | Lee |
| 2015/0271679 A1 | 9/2015 | Park |
| 2015/0278805 A1 | 10/2015 | Spencer, III |
| 2015/0280911 A1 | 10/2015 | Andoni |
| 2015/0294092 A1 | 10/2015 | Balasubramanian |
| 2015/0294784 A1 | 10/2015 | Higashiyama |
| 2015/0310444 A1 | 10/2015 | Chen |
| 2015/0347734 A1 | 12/2015 | Beigi |
| 2015/0350201 A1 | 12/2015 | Cornell |
| 2015/0356289 A1 | 12/2015 | Brown |
| 2015/0356462 A1 | 12/2015 | Fawaz |
| 2015/0365229 A1 | 12/2015 | Patey |
| 2015/0365235 A1 | 12/2015 | Hostyn |
| 2015/0370826 A1 | 12/2015 | Mraz |
| 2015/0370993 A1 | 12/2015 | Moturu |
| 2015/0373007 A1 | 12/2015 | Sheller |
| 2015/0379238 A1 | 12/2015 | Connor |
| 2016/0007288 A1 | 1/2016 | Samardzija |
| 2016/0011224 A1 | 1/2016 | Pollack |
| 2016/0022193 A1 | 1/2016 | Rau |
| 2016/0055327 A1 | 2/2016 | Moran |
| 2016/0057623 A1 | 2/2016 | Dutt |
| 2016/0063492 A1 | 3/2016 | Kobres |
| 2016/0063874 A1 | 3/2016 | Czerwinski |
| 2016/0065558 A1 | 3/2016 | Suresh |
| 2016/0065570 A1 | 3/2016 | Spencer |
| 2016/0098334 A1 | 4/2016 | Hariharakrishnan |
| 2016/0103984 A1 | 4/2016 | Warrier |
| 2016/0103996 A1 | 4/2016 | Salajegheh |
| 2016/0110528 A1 | 4/2016 | Gupta |
| 2016/0117673 A1 | 4/2016 | Landrock |
| 2016/0125920 A1 | 5/2016 | Kim |
| 2016/0135107 A1 | 5/2016 | Hampel |
| 2016/0140320 A1 | 5/2016 | Moturu |
| 2016/0148222 A1 | 5/2016 | Davar |
| 2016/0151603 A1 | 6/2016 | Shouldice |
| 2016/0180078 A1 | 6/2016 | Chhabra |
| 2016/0182503 A1 | 6/2016 | Cheng |
| 2016/0183795 A1 | 6/2016 | Cowley |
| 2016/0191499 A1 | 6/2016 | Momchillov |
| 2016/0220151 A1 | 8/2016 | Zizi |
| 2016/0227411 A1 | 8/2016 | Lundblade |
| 2016/0232726 A1 | 8/2016 | Zizi |
| 2016/0239649 A1 | 8/2016 | Zhao |
| 2016/0239657 A1 | 8/2016 | Loughlin-McHugh et al. |
| 2016/0253498 A1 | 9/2016 | Valencia |
| 2016/0283406 A1 | 9/2016 | Linga |
| 2016/0300049 A1 | 10/2016 | Guedalia |
| 2016/0320831 A1 | 11/2016 | McCubbin |
| 2016/0342873 A1 | 11/2016 | Winkk et al. |
| 2016/0352696 A1 | 12/2016 | Essigmann |
| 2016/0357944 A1 | 12/2016 | Iyer |
| 2017/0000422 A1 | 1/2017 | Moturu |
| 2017/0005995 A1 | 1/2017 | Yang |
| 2017/0013453 A1 | 1/2017 | Lee |
| 2017/0024660 A1 | 1/2017 | Chen |

(56) References Cited

U.S. PATENT DOCUMENTS

| | | |
|---|---|---|
| 2017/0041309 A1 | 2/2017 | Ekambaram et al. |
| 2017/0048062 A1 | 2/2017 | Polak |
| 2017/0055878 A1 | 3/2017 | Chon |
| 2017/0063528 A1 | 3/2017 | Seo |
| 2017/0068994 A1 | 3/2017 | Slomkowski |
| 2017/0070340 A1 | 3/2017 | Hibshoosh |
| 2017/0070890 A1 | 3/2017 | Luff |
| 2017/0085382 A1 | 3/2017 | Kamakari |
| 2017/0104590 A1* | 4/2017 | Wang .................... H03M 13/05 |
| 2017/0116402 A1 | 4/2017 | Hirabayashi |
| 2017/0124385 A1 | 5/2017 | Ganong |
| 2017/0134372 A1 | 5/2017 | Dube |
| 2017/0147345 A1 | 5/2017 | Clevenger |
| 2017/0174180 A1 | 6/2017 | Hoyos |
| 2017/0188938 A1 | 7/2017 | Toh |
| 2017/0193211 A1 | 7/2017 | Blake |
| 2017/0214529 A1 | 7/2017 | Oliveira |
| 2017/0220407 A1 | 8/2017 | Estrada |
| 2017/0230172 A1 | 8/2017 | Andersson |
| 2017/0230344 A1 | 8/2017 | Dhar |
| 2017/0264597 A1 | 9/2017 | Pizot |
| 2017/0272419 A1 | 9/2017 | Kumar |
| 2017/0287490 A1 | 10/2017 | Biswal |
| 2017/0289168 A1 | 10/2017 | Bar |
| 2017/0295010 A1 | 10/2017 | Shibutani |
| 2017/0310479 A1 | 10/2017 | Sato |
| 2017/0311250 A1 | 10/2017 | Rico Alvarino |
| 2017/0317823 A1 | 11/2017 | Gandhi |
| 2017/0337364 A1 | 11/2017 | Whaley |
| 2017/0339118 A1 | 11/2017 | Hwang |
| 2017/0366514 A1 | 12/2017 | Malka |
| 2018/0000367 A1 | 1/2018 | Longinotti-Buitoni |
| 2018/0005239 A1 | 1/2018 | Schlesinger |
| 2018/0005465 A1 | 1/2018 | Truong |
| 2018/0007530 A1 | 1/2018 | Tanaka |
| 2018/0012003 A1 | 1/2018 | Asulin |
| 2018/0025125 A1 | 1/2018 | Crane |
| 2018/0025135 A1 | 1/2018 | Odom |
| 2018/0027411 A1 | 1/2018 | Taneja |
| 2018/0029560 A1 | 2/2018 | Mohaupt |
| 2018/0039990 A1 | 2/2018 | Lindermann |
| 2018/0046803 A1 | 2/2018 | Li |
| 2018/0063784 A1 | 3/2018 | Abraham |
| 2018/0089408 A1 | 3/2018 | Cheung |
| 2018/0109696 A1 | 4/2018 | Thanigasalam |
| 2018/0114221 A1 | 4/2018 | Karantzis |
| 2018/0135815 A1 | 5/2018 | Rowles |
| 2018/0144615 A1 | 5/2018 | Kinney |
| 2018/0150622 A1 | 5/2018 | Zaitsev |
| 2018/0165432 A1 | 6/2018 | Cierna |
| 2018/0167816 A1 | 6/2018 | Kusens et al. |
| 2018/0176015 A1* | 6/2018 | Wang .................... H04L 9/0825 |
| 2018/0189160 A1 | 7/2018 | Yasin |
| 2018/0189161 A1 | 7/2018 | Yasin |
| 2018/0212770 A1 | 7/2018 | Costa |
| 2018/0248865 A1 | 8/2018 | Johansson |
| 2018/0285580 A1 | 10/2018 | Chen |
| 2018/0285879 A1 | 10/2018 | Gadnis |
| 2018/0302416 A1 | 10/2018 | Einberg |
| 2018/0322266 A1 | 11/2018 | Kwok Suzuki |
| 2018/0329857 A1 | 11/2018 | Ko |
| 2018/0350455 A1 | 12/2018 | Rosen |
| 2018/0359112 A1 | 12/2018 | Lee |
| 2018/0375848 A1 | 12/2018 | Tunnell |
| 2019/0000350 A1 | 1/2019 | Narayan |
| 2019/0021001 A1 | 1/2019 | Park |
| 2019/0095320 A1 | 3/2019 | Biswas |
| 2019/0103957 A1 | 4/2019 | Isobe |
| 2019/0121989 A1 | 4/2019 | Mousseau |
| 2019/0122024 A1 | 4/2019 | Schwartz |
| 2019/0133537 A1 | 5/2019 | Ghose |
| 2019/0149333 A1 | 5/2019 | Harnik |
| 2019/0188111 A1 | 6/2019 | Ozog |
| 2019/0207918 A1 | 7/2019 | Kurian |
| 2019/0220583 A1 | 7/2019 | Douglas |
| 2019/0230170 A1 | 7/2019 | Marlin |
| 2019/0236465 A1 | 8/2019 | Vieugels |
| 2019/0243956 A1 | 8/2019 | Sheets |
| 2019/0245704 A1 | 8/2019 | Pala |
| 2019/0268774 A1 | 8/2019 | Kusens et al. |
| 2019/0271349 A1 | 9/2019 | Madru |
| 2019/0271578 A1 | 9/2019 | Moeller |
| 2019/0272495 A1 | 9/2019 | Moeller |
| 2019/0278895 A1 | 9/2019 | Streit |
| 2019/0279204 A1 | 9/2019 | Norton |
| 2019/0280868 A1 | 9/2019 | Streit |
| 2019/0281025 A1 | 9/2019 | Harriman |
| 2019/0281036 A1 | 9/2019 | Eisen |
| 2019/0287427 A1 | 9/2019 | Schepers |
| 2019/0289017 A1 | 9/2019 | Agarwal |
| 2019/0304575 A1 | 10/2019 | Beltre |
| 2019/0318122 A1 | 10/2019 | Hockey |
| 2019/0334708 A1 | 10/2019 | Carpor |
| 2019/0336046 A1 | 11/2019 | Shuster |
| 2019/0342092 A1 | 11/2019 | Handschuh |
| 2019/0347888 A1 | 11/2019 | Agbeyo |
| 2019/0354660 A1 | 11/2019 | Fong |
| 2019/0354787 A1 | 11/2019 | Fong |
| 2019/0370445 A1 | 12/2019 | Fong |
| 2019/0386814 A1 | 12/2019 | Ahmed |
| 2019/0387098 A1 | 12/2019 | McEnroe |
| 2019/0391895 A1 | 12/2019 | Della Corte |
| 2020/0014541 A1 | 1/2020 | Streit |
| 2020/0029214 A1 | 1/2020 | Aylward |
| 2020/0042723 A1 | 2/2020 | Krishnamoorthy |
| 2020/0044852 A1 | 2/2020 | Streit |
| 2020/0050745 A1 | 2/2020 | Kim |
| 2020/0050931 A1 | 2/2020 | Bharti |
| 2020/0053096 A1 | 2/2020 | Bendersky |
| 2020/0066071 A1 | 2/2020 | Budman |
| 2020/0092111 A1* | 3/2020 | Anshel ................ H04L 63/0435 |
| 2020/0097643 A1 | 3/2020 | Uzun |
| 2020/0099675 A1 | 3/2020 | Mardkis Rappaport |
| 2020/0100115 A1 | 3/2020 | Skaaksrud |
| 2020/0120071 A1 | 4/2020 | Wimmer |
| 2020/0125704 A1 | 4/2020 | Chavez |
| 2020/0127974 A1 | 4/2020 | Moralndo |
| 2020/0133373 A1 | 4/2020 | Huang |
| 2020/0134145 A1 | 4/2020 | Bapst |
| 2020/0151430 A1 | 5/2020 | Hassan |
| 2020/0152206 A1 | 5/2020 | Shen |
| 2020/0156654 A1 | 5/2020 | Boss |
| 2020/0162435 A1 | 5/2020 | Kubo |
| 2020/0175157 A1 | 6/2020 | Wilding |
| 2020/0193051 A1 | 6/2020 | Van Antwerp |
| 2020/0242417 A1 | 7/2020 | Sagi |
| 2020/0267709 A1 | 8/2020 | Feng |
| 2020/0302310 A1 | 9/2020 | Woiceshyn |
| 2020/0320282 A1 | 10/2020 | Boic |
| 2020/0349245 A1 | 11/2020 | Shila |
| 2020/0358611 A1 | 11/2020 | Hoang |
| 2020/0358787 A1 | 11/2020 | Barker |
| 2020/0366671 A1 | 11/2020 | Ramirez |
| 2020/0383633 A1 | 12/2020 | Su |
| 2020/0387696 A1 | 12/2020 | Kushwah |
| 2020/0403787 A1 | 12/2020 | Islam |
| 2020/0403992 A1 | 12/2020 | Huffman |
| 2021/0005224 A1 | 1/2021 | Rothschild |
| 2021/0014314 A1 | 1/2021 | Yamada |
| 2021/0036851 A1 | 2/2021 | Villapakkam |
| 2021/0049032 A1 | 2/2021 | White |
| 2021/0051015 A1 | 2/2021 | Widmann |
| 2021/0051177 A1 | 2/2021 | White |
| 2021/0096826 A1 | 4/2021 | Duggal |
| 2021/0123835 A1 | 4/2021 | Glennon |
| 2021/0152348 A1* | 5/2021 | Shim .................... H04L 9/30 |
| 2021/0152417 A1 | 5/2021 | Baird |
| 2021/0152554 A1 | 5/2021 | Taft |
| 2021/0157291 A1 | 5/2021 | Uchizawa |
| 2021/0167946 A1 | 6/2021 | Bitan |
| 2021/0173906 A1 | 6/2021 | Keith, Jr. |
| 2021/0173907 A1 | 6/2021 | Keith, Jr. |
| 2021/0173914 A1 | 6/2021 | Keith, Jr. |
| 2021/0173915 A1 | 6/2021 | Keith, Jr. |

(56) References Cited

U.S. PATENT DOCUMENTS

| | | |
|---|---|---|
| 2021/0173949 A1 | 6/2021 | Keith, Jr. |
| 2021/0174333 A1 | 6/2021 | Keith, Jr. |
| 2021/0176064 A1 | 6/2021 | Keith, Jr. |
| 2021/0176066 A1 | 6/2021 | Keith, Jr. |
| 2021/0176218 A1 | 6/2021 | Keith, Jr. |
| 2021/0176223 A1 | 6/2021 | Falk |
| 2021/0176235 A1 | 6/2021 | Keith, Jr. |
| 2021/0176633 A1 | 6/2021 | Keith, Jr. |
| 2021/0183512 A1 | 6/2021 | Van Dusen |
| 2021/0194608 A1 | 6/2021 | Yao |
| 2021/0200852 A1 | 7/2021 | Gupta |
| 2021/0248928 A1 | 8/2021 | Akiyama |
| 2021/0250759 A1 | 8/2021 | Ziv |
| 2021/0281421 A1 | 9/2021 | Semenovskiy |
| 2021/0297258 A1 | 9/2021 | Keith, Jr. |
| 2021/0297448 A1 | 9/2021 | Keith, Jr. |
| 2021/0297455 A1 | 9/2021 | Keith, Jr. |
| 2021/0350918 A1 | 11/2021 | Paul |
| 2021/0362750 A1 | 11/2021 | Yang |
| 2021/0390537 A1 | 12/2021 | Budko et al. |
| 2022/0027439 A1 | 1/2022 | Greenberger |
| 2022/0027447 A1 | 1/2022 | Keith, Jr. |
| 2022/0028200 A1 | 1/2022 | Keith, Jr. |
| 2022/0030022 A1 | 1/2022 | Keith, Jr. |
| 2022/0036905 A1 | 2/2022 | Keith, Jr. |
| 2022/0038895 A1 | 2/2022 | Keith, Jr. |
| 2022/0038897 A1 | 2/2022 | Liu |
| 2022/0043913 A1 | 2/2022 | Keith, Jr. |
| 2022/0045841 A1 | 2/2022 | Keith, Jr. |
| 2022/0045865 A1* | 2/2022 | Mukherjee ............ H04L 9/3247 |
| 2022/0092161 A1 | 3/2022 | Keith, Jr. |
| 2022/0092162 A1 | 3/2022 | Keith, Jr. |
| 2022/0092163 A1 | 3/2022 | Keith, Jr. |
| 2022/0092164 A1 | 3/2022 | Keith, Jr. |
| 2022/0092165 A1 | 3/2022 | Keith, Jr. |
| 2022/0093256 A1 | 3/2022 | Keith, Jr. |
| 2022/0094545 A1 | 3/2022 | Islamov et al. |
| 2022/0094550 A1 | 3/2022 | Keith, Jr. |
| 2022/0108026 A1 | 4/2022 | Ortiz et al. |
| 2022/0130501 A1 | 4/2022 | Keith, Jr. |
| 2022/0138300 A1 | 5/2022 | Manjunath et al. |
| 2022/0139546 A1 | 5/2022 | Manjunath et al. |
| 2022/0164424 A1 | 5/2022 | Keith, Jr. |
| 2022/0165393 A1 | 5/2022 | Inz |
| 2022/0197985 A1 | 6/2022 | Keith, Jr. |
| 2022/0200971 A1 | 6/2022 | Vigneswaran |
| 2022/0223292 A1 | 7/2022 | Devitt |
| 2022/0229888 A1 | 7/2022 | Keith, Jr. |
| 2022/0253513 A1 | 8/2022 | Aras |
| 2022/0286966 A1 | 9/2022 | Zhao |
| 2022/0309407 A1 | 9/2022 | Ramirez |
| 2022/0337425 A1* | 10/2022 | Kim ...................... H04L 9/3247 |
| 2022/0382844 A1 | 12/2022 | Keith, Jr. |
| 2022/0385458 A1 | 12/2022 | Keith, Jr. |
| 2022/0394023 A1 | 12/2022 | Keith, Jr. |
| 2022/0394464 A1 | 12/2022 | Keith, Jr. |
| 2022/0394465 A1 | 12/2022 | Keith, Jr. |
| 2023/0096233 A1 | 3/2023 | Islamov et al. |
| 2023/0106024 A1 | 4/2023 | Keith, Jr. |
| 2023/0107624 A1 | 4/2023 | Keith, Jr. |
| 2023/0114650 A1 | 4/2023 | Keith, Jr. |
| 2023/0116527 A1 | 4/2023 | Keith, Jr. |
| 2023/0185896 A1 | 6/2023 | Keith, Jr. |
| 2023/0187062 A1 | 6/2023 | Weijsen |
| 2023/0198766 A1 | 6/2023 | Keith, Jr. |
| 2023/0198962 A1 | 6/2023 | Keith, Jr. |
| 2023/0254120 A1 | 8/2023 | Islamov |
| 2023/0254121 A1 | 8/2023 | Islamov |
| 2023/0254122 A1 | 8/2023 | Islamov |
| 2023/0267454 A1 | 8/2023 | Budko |
| 2023/0283602 A1 | 9/2023 | Keith, Jr. |
| 2023/0289431 A1 | 9/2023 | Keith, Jr. |
| 2023/0291573 A1* | 9/2023 | Cheon ................... H04L 9/3247 |

FOREIGN PATENT DOCUMENTS

| | | |
|---|---|---|
| CN | 107924475 A | 4/2018 |
| CN | 106413128 B | 7/2020 |
| EP | 3276561 A | 1/2018 |
| EP | 3457344 A1 | 3/2019 |
| WO | WO2009060004 A1 | 5/2009 |
| WO | WO2009066004 A1 | 5/2009 |
| WO | 2016179433 A1 | 11/2016 |
| WO | 2020065132 A1 | 4/2020 |
| WO | 2020092542 A1 | 5/2020 |
| WO | 2021119187 A1 | 7/2021 |
| WO | WO-2022172040 A1 * | 8/2022 ............... H04L 9/00 |

OTHER PUBLICATIONS

Erdem Alkim et al., "Post-Quantum key exchange—a new hope", International Association For Cryptologic Research, vol. 20161116:063839, Nov. 16, 2016, pp. 1-22.

Joppe W. Bos et al., "Post-quantum key exchange for the TLS protocol from the ring learning with errors problem", International Association for Cryptologic Research, vol. 20150316:235249, Mar. 17, 2015, pp. 1-28.

International Search Report mailed Aug. 11, 2016, for PCT Application No. PCT/US2016/031055, filed May 5, 2016, five pages.

International Search Report mailed Oct. 9, 2019, for PCT Application No. PCT/US2019/041871, filed Jul. 15, 2019, four pages.

Li et al., "Addressable Metasurfaces for Dynamic Holography and Optical Information Encryption", Jun. 15, 2018, http://advances.sciencemag.org/content/advances/4/6/eaar6768.full.pdf.

International Search Report and Written Report for the International Application No. PCT/US2020/064099 dated Mar. 16, 2021.

Bywater Films, "Winkk: Emotion to Action." Vimeo, published Oct. 7, 2015 (Retrieved from the Internet Mar. 22, 2021). Internet URL: <https://vimeo.com/141695923> (Year: 2015).

Schiff, Eli, "Unofficial Apple Icon Design Awards." Eli Schiff Blog, published Jan. 5, 2016 (Retrieved from the Internet Mar. 22, 2021), Internet URL: <www.elischiff.com/blog/2016/1/5/apple-icon-design-awards> (Year: 2016).

International Report on Patentability from International Application No. PCT/US2020/064099, mailed on Jun. 23, 2022, 7 pages.

Magoon, Owais, "iOS app." Behance published Sep. 7, 2015 (Retrieved from the Internet Mar. 22, 2021). Internet URL: <https://www.behance.net/gallery/27383661/iOS-app> (Year: 2015).

Jeffrey, B.A., Hannan, M.T., Quinn, E.K., Zimmerman, S., Barton, B.A. , Rubin, C.T., &Kiel, D. P. (2012). Self-reported adherence with the use of a device in a clinical trial . . . electronic monitors: The VIBES study. BMC Medical Research Methodology, 12 n/a-171.doi:http://dx.doi.org (Year: 2012).

* cited by examiner

AUTHENTICATION PROCESS

CROSS-REFERENCE TO RELATED APPLICATION(S)

This application claims priority under 35 U.S.C. § 119(e) of the U.S. Provisional Patent Application Ser. No. 63/408,543, filed Sep. 21, 2022 and titled, "DIOPHANTINE SYSTEM FOR DIGITAL SIGNATURES," which is hereby incorporated by reference in its entirety for all purposes.

FIELD OF THE INVENTION

The present invention relates to digital signatures. More specifically, the present invention relates to digital signatures using Diophantine systems.

BACKGROUND OF THE INVENTION

A digital signature is a mathematical scheme for demonstrating the authenticity of digital messages or documents. The digital signature is a mathematical code that authenticates the document from the sender and ensures the document remains unaltered on reaching the recipient. Digital signatures employ asymmetric cryptography. Digital signatures can also provide non-repudiation, meaning that the signer cannot successfully claim that the signer did not sign a message, while also claiming their private key remains secret.

DETAILED DESCRIPTION

The present disclosure relates to implementing digital signatures using the Diophantine system of equations. A digital signature is an authentication mechanism that enables the creator of a message to attach a code that acts as a signature. A digital signature scheme typically includes three algorithms: a key generation algorithm, a signing algorithm, and a signature verifying algorithm. The key generation algorithm selects a private key uniformly at random from a set of possible private keys. The key generation algorithm outputs the private key and a corresponding public key. The signing algorithm produces a signature given a message and a private key. The signature verifying algorithm either accepts or rejects a message's claim to authenticity based at least in part on the message, the public key, and the signature.

Digital signature schemes have two primary properties. First, the authenticity of a signature generated from a fixed message and fixed private key can be verified by using the corresponding public key. Second, it should be computationally infeasible to generate a valid signature for a party without knowing that party's private key.

However, the fundamentals of digital signatures merit revision because of the computational properties of quantum computers. A digital signature should not have an algorithm for calculating a private key on an open key except for brute force. The algorithm for calculating the private key using a public key should be protected from parallel or sequential computations. The algorithm should be able to subsequently increase the complexity of calculations, for example, with increasing the length of the key.

Various embodiments of the present disclosure introduce a digital signature scheme developed to be secure against standard and quantum computing. This digital signature scheme is based on the Diophantine system of equations (e.g., a polynomial equation with integer coefficients and a finite number of unknowns) and uniform distribution of random variables. The resistance against standard and quantum computing follows from the Hilbert's tenth problem: for any given Diophantine equation, the general algorithm (e.g., whether the equation has a solution with all unknowns taking integer values) does not exist. Also, the system of equation is cycled in respect to the parameters, thereby providing protection against parallel computation.

Figure 1:
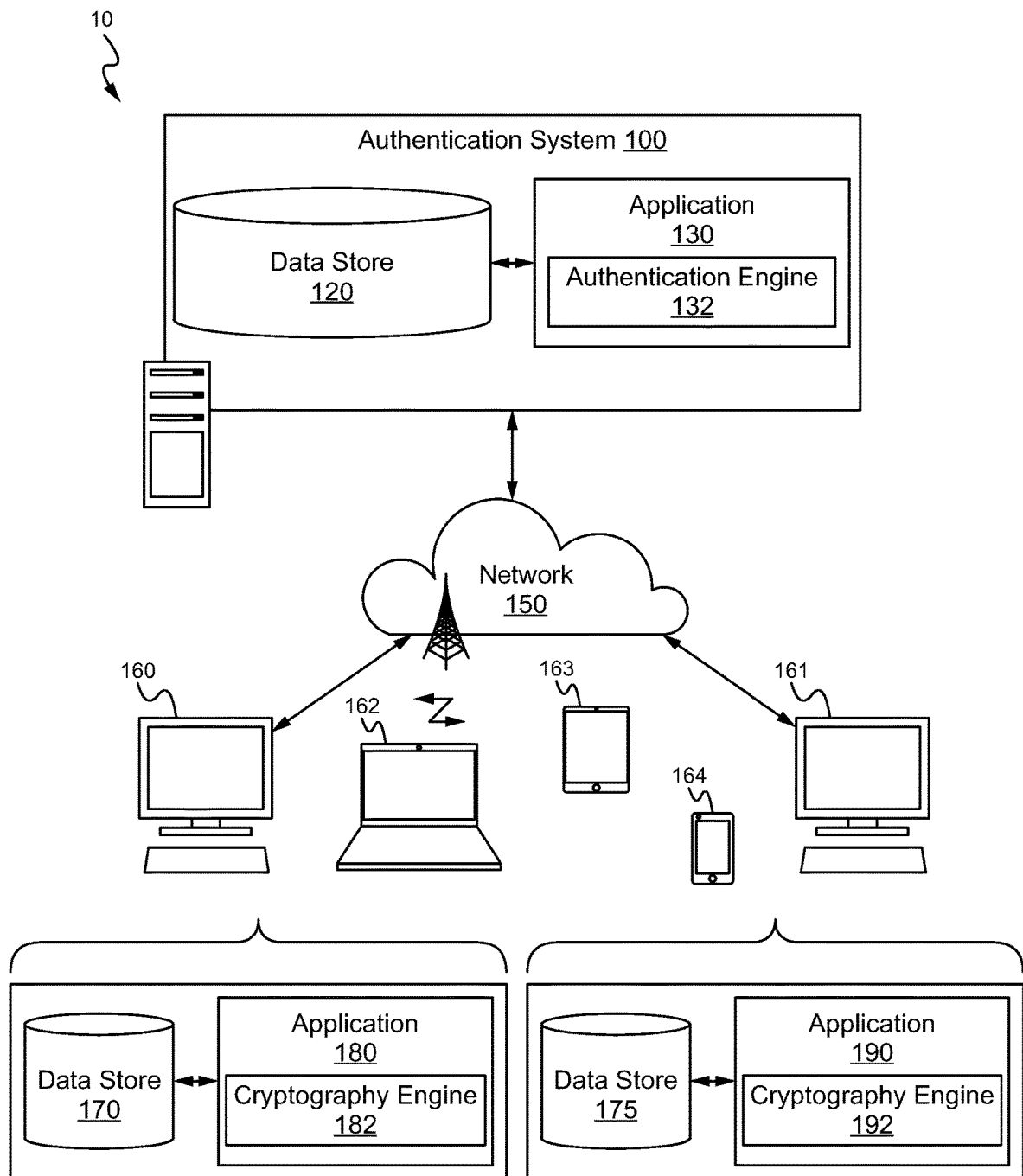
FIG. 1 illustrates an example networked environment for using digital signatures according to various examples described herein.

Turning to the drawings, FIG. 1 illustrates an example networked environment 10 for using digital signatures according to various examples described herein. The networked environment 10 includes an authentication system 100, a network 150, and a number of computing devices 160-164 communicatively coupled to each other (and to the authentication system 100) over the network 150. The networked environment 10 is provided as a representative example of a system in which computing devices are capable of communicating data among each other. As described below, the authentication system 100 and the computing devices 160-164 can securely communicate data between each other to implement the digital signature scheme described herein. However, the concepts described herein can be applied to other networked computing environments, systems, and devices.

The authentication system 100 can be embodied as one or more computing environments, computer systems, computing devices, or processing systems or devices. The authentication system 100 can include one or more computing devices arranged, for example, in one or more server or computer banks. The computing device or devices can be located at a single installation site or distributed among different geographical locations. The authentication system 100 can include a plurality of computing devices that together embody a hosted computing resource, a grid computing resource, or other distributed computing arrangement. In some cases, the authentication system 100 can be embodied as an elastic computing resource where an allotted capacity of processing, network, storage, or other computing-related resources varies over time. As further described below, the authentication system 100 can also be embodied, in part, as certain functional or logical (e.g., computer-readable instruction) elements or modules. Those elements can be executed to direct the authentication system 100 to act as an authentication or identity-verification system in the networked environment 10, as described in further detail below.

As also shown in FIG. 1, the authentication system 100 includes a data store 120 and an application 130. The data store 120 can be embodied as a memory, of any suitable type, and can be used to store data and data files, including sensitive or secret data, executable code, and other information. The application 130 is an example of one application program executable on the authentication system 100. The authentication system 100 can host and execute any number of applications concurrently, as would be understood in the field of computing. As shown in FIG. 1, the application 130 includes an authentication engine 132. The operation of the authentication system 100, including the application 130 and the authentication engine 132, is described in greater detail below.

The network 150 can include the Internet, intranets, extranets, wide area networks (WANs), local area networks (LANs), wired networks, wireless networks, cable networks, satellite networks, other suitable networks, or any combinations thereof. As one example, the authentication system 100 and the computing devices 160-164 can be respectively coupled to one or more public or private LANs or WANs and, in turn, to the Internet for communication of data among each other. Although not shown in FIG. 1, the network 150 can also include communicative connections to any number and type of network hosts or devices, such as website servers, file servers, cloud computing resources, databases, data stores, or any other network or computing architectures.

In the networked environment 10, the authentication system 100 and the computing devices 160-164 can communicate data among each other using one or more network transfer protocols or interconnect frameworks, such as hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), internet protocol (IP), transmission control protocol (TCP), other protocols and interconnect frameworks, and combinations thereof.

As noted above, the authentication system 100 and the computing devices 160-164 can communicate data between each other over the network 150. The concepts and processes described herein can be relied upon to exchange and verify messages between and among the authentication system 100 and the computing devices 160-164 over the network 150.

The computing devices 160-164 are representative of various types of computing devices, processing devices, and/or processor-based device or systems, including those in the form of a server computer, desktop computer, a laptop computer, a tablet computer, a personal digital assistant, a cellular telephone, a wearable computing device, a set-top box, and other example computing devices and systems. Each of the computing devices 160-164 can include one or more processors or processing devices, cryptographic trusted platform modules (TPMs), memory devices, local interfaces, various peripheral devices, and other components. The peripheral devices can include input or communications devices or modules, such as keyboards, keypads, touch pads, touch screens, microphones, cameras, network communications interfaces, wireless network communications modules (e.g., infra-red, WI-FI®, or BLUETOOTH®), buttons, switches, sensors, etc. The peripheral devices can also include a display, indicator lights, speakers, global positioning system (GPS) circuitry, accelerometers, gyroscopes, and other peripheral devices.

As shown in FIG. 1, the computing device 160 includes a data store 170 and an application 180. The data store 170 can be embodied as any suitable type of memory and can be used to store data and data files, including data to be signed in plaintext or ciphertext forms, random numbers, executable code, and other information. In some cases, the data store 170 includes, at least in part, the memory of a TPM.

The application 180 is an example of one application program executable on the computing device 160. The computing device 160 can host and execute any number of applications concurrently, as would be understood in the field of computing. As one example, the application 180 can be embodied as a hypertext-based network browser, such as the Internet Explorer®, Firefox®, Chrome®, Safari®, or Silk® browsers, among other types of browsers. Additionally or alternatively, the application 180 can be embodied as an e-mail client, messaging client, or other application(s) for other purpose(s). In any case, when executed on the computing device 160, the application 180 can receive user input and data, process data, interpret and render various interfaces on display devices, and conduct other processes and tasks. As shown in FIG. 1, the application 180 includes a cryptography engine 182 (also, "first engine 182"), among other application submodules.

The computing device 161 includes a data store 175 and an application 190. The data store 175 can be embodied as any suitable type of memory and can be used to store data and data files, including sensitive or secret data, executable code, and other information. The application 190 is an example of one application program executable on the computing device 161. The computing device 161 can host and execute any number of applications concurrently, as would be understood in the field of computing. As one example, the application 190 can be embodied as a hypertext-based network browser, such as the Internet Explorer®, Firefox®, Chrome®, Safari®, or Silk® browsers, among other types of browsers. Additionally or alternatively, the application 190 can be embodied as an e-mail client, messaging client, or other application(s) for other purpose(s). In any case, when executed on the computing device 161, the application 190 can receive user input and data, process data, interpret and render various interfaces on display devices, and conduct other processes and tasks. As shown in FIG. 1, the application 190 includes a cryptography engine 192 (also, "second engine 192"), among other application submodules.

Figure 2:
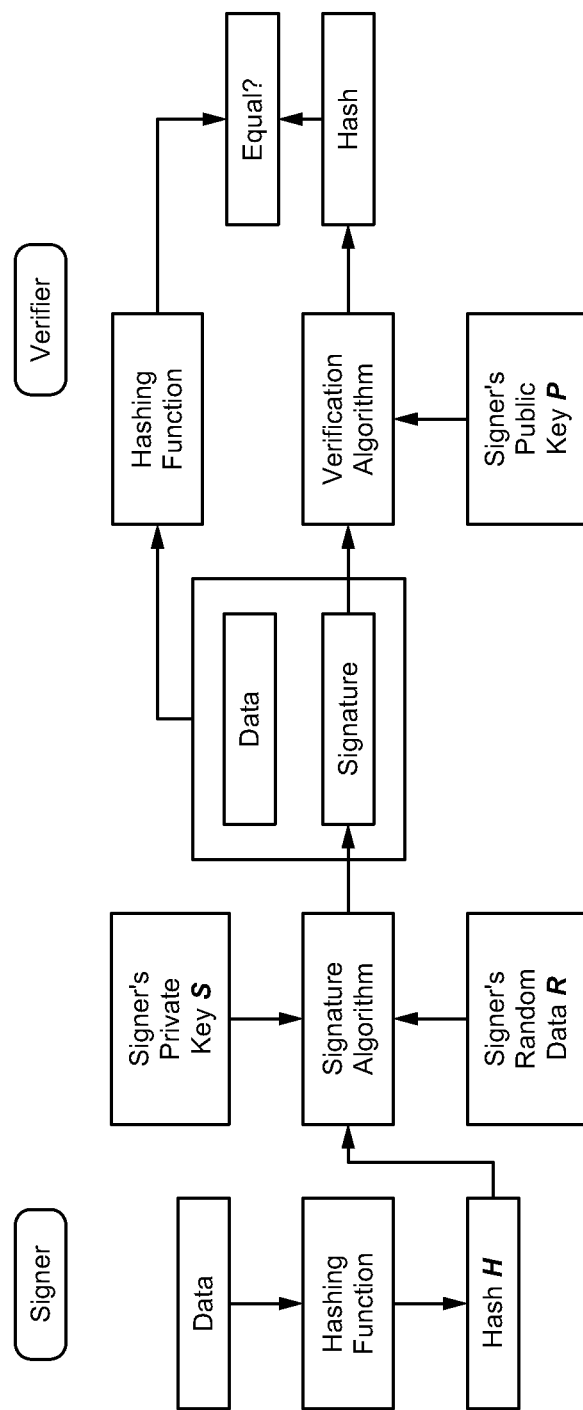
FIG. 2 depicts a model of a digital signature scheme according to one or more embodiments.

FIG. 2 depicts a model of a digital signature scheme according to one or more embodiments. The digital signature scheme is based on public key cryptography. Each user adopting this scheme has a public-private key pair. Generally, the key pairs used for encryption/decryption and signing/verifying are different. The private key used for signing is referred to as the signature key S and the public key P as the verification key.

The signer feeds data to the hash function and generates a hash H of data. The hash value H, and the signer's random data R and signature key S are then fed to the signature algorithm, which produces the digital signature on the given hash. A signature is appended to the data and then both are sent to the verifier.

The verifier feeds the digital signature and the verification key into the verification algorithm. The verification algorithm gives some value as its output. The verifier also runs the same hash function on the received data to generate a hash value. For verification, the hash value and the output of verification algorithm are compared. Based on the comparison result, the verifier determines whether the digital signature is valid. Since the digital signature is created by "private" key of signer and no one else can have this key, the signer cannot repudiate having signed the data in future.

It should be noticed that instead of signing data directly by signing algorithm, a hash of data is created. Since the hash of data is a unique representation of data, it is sufficient to sign the hash in place of the original data. A reason for using the hash instead of the data directly for signing is efficiency of the scheme. Signing a large data object through modular exponentiation is computationally expensive and time consuming. The hash of the data is a relatively small digest of the data. Therefore, signing a hash is more efficient than signing the entire data.

Consider the message M as a set of $n_m$ bytes, each including one of the American Standard Code for Information Interchange (ASCII) codes from 0 to 255, as follows:

$$M=\{m_1,m_2,\ldots,m_{n_m}\}, 0 \leq m_i \leq 255 \qquad (1)$$

The private (secret) key integer number array S and random integer number array R are used to sign the message (digital signature).

$$S=\{s_1,s_2,\ldots,s_{n_s}\}, 1 \leq s_i \leq 2^L \qquad (2)$$

$$R=\{r_1,r_2,\ldots,r_{n_r}\}, 1 \leq r_i \leq 2^L \qquad (3)$$

The public key integer number array P is used to check the digital signature.

$$P=\{p_1,p_2,\ldots,p_{n_p}\}, 1 \leq p_i \leq 2^L \qquad (4)$$

The initial message M is transferred into the hash H using the hash function F.

$$H=F(M) \qquad (5)$$

$$H=\{h_1,h_2,\ldots,h_{n_h}\}, 0 \leq h_i \leq 2^L \qquad (6)$$

For instance, in the case of using the hash function algorithm SHA512, $n_h$=N=64, L=16.

In various embodiments, the digital signature scheme uses the following matrix form for second order Diophantine equations:

$$X_1 A X_2 = B \qquad (7)$$

where 
$$X_1 = \begin{vmatrix} x_{11} & x_{12} & \cdots & x_{1n} \\ x_{21} & x_{22} & \cdots & x_{2n} \\ \cdots & \cdots & \ddots & \cdots \\ x_{m1} & x_{m2} & \cdots & x_{mn} \end{vmatrix},$$

$$X_2 = \begin{vmatrix} x_{m+1,n+1} & x_{m+1,n+2} & \cdots & x_{m+1,2n} \\ x_{m+2,n+1} & x_{m+2,n+2} & \cdots & x_{m+2,2n} \\ \cdots & \cdots & \ddots & \cdots \\ x_{2m,n+1} & x_{2m,n+2} & \cdots & x_{2m,2n} \end{vmatrix}$$

$$x_{kl} \in Z, k=1,2m, l=1,2n$$

-continued $$A = \begin{vmatrix} a_{11} & a_{12} & \cdots & a_{1n} \\ a_{21} & a_{22} & \cdots & a_{2n} \\ \cdots & \cdots & \ddots & \cdots \\ a_{m1} & a_{m2} & \cdots & a_{mn} \end{vmatrix}, B = \begin{vmatrix} b_{11} & b_{12} & \cdots & b_{1n} \\ b_{21} & b_{22} & \cdots & b_{2n} \\ \cdots & \cdots & \ddots & \cdots \\ b_{m1} & b_{m2} & \cdots & b_{mn} \end{vmatrix}$$

$$a_{ij}, b_{ij} \in Z, i=1,m, j=1,n$$

The singular matrices $X^{(1)}$, $X^{(2)}$ and regular matrices $A^{(1)}$, $A^{(2)}$ are the signer's private key.

The singular matrices X and Y are used as a public key from the following relations:

$$X=X^{(1)}X^{(2)}$$

$$Y^{(1)}=A^{(1)}X^{(1)} \qquad (8)$$

$$Y^{(2)}=X^{(2)}A^{(2)}$$

$$Y=Y^{(1)}Y^{(2)}=A^{(1)}XA^{(2)} \qquad (9)$$

Assume that the singular matrices $H^{(1)}$, $H^{(2)}$ represent the hash function of data. The regular matrices $R^{(1)}$, $R^{(2)}$ are randomly generated by the signer and form the matrices $W^{(1)}$, $W^{(2)}$ as follows:

$$W^{(1)}=A^{(1)}+R^{(1)}$$

$$W^{(2)}=A^{(2)}+R^{(2)} \qquad (10)$$

The singular matrices $Z^{(1)}$, $Z^{(2)}$ are calculated as follows:

$$Z^{(1)}=H^{(1)}W^{(1)}$$

$$Z^{(2)}=W^{(2)}H^{(2)} \qquad (11)$$

The signer uses the matrices $Z^{(1)}$, $Z^{(2)}$ and $Y_R$ as the signer's signature in the following relation:

$$H^{(1)}(Y+Y_R)H^{(2)}=Z^{(1)}XZ^{(2)}$$

where $$Y_R=R^{(1)}XA^{(2)}+A^{(1)}XR^{(2)}+R^{(1)}XR^{(2)} \qquad (12)$$

The verifier checks the equation (11) using public key X,Y and the matrices $Z^{(1)}$, $Z^{(2)}$ and $Y_R$ as the signer's signature.

The resistance of the proposed algorithm is based on the Hilbert's tenth problem: for any given Diophantine equation, the general algorithm (whether the equation has a solution with all unknowns taking integer values) does not exist. Breaking the algorithm would involve solving one of the following tasks:

First, to find unknown variables in matrices $A^{(1)}$, $A^{(2)}$ from Diophantine second order equation (9):

$$Y=A^{(1)}XA^{(2)}$$

Second, to find unknown variables in matrices $Z^{(1)}$, $Z^{(2)}$ and $Y_R$ from Diophantine second order equation (12):

$$H^{(1)}(Y+Y_R)H^{(2)}=Z^{(1)}XZ^{(2)}$$

In accordance with the Hilbert's Tenth Problem, there is no algorithm except for the brute force for both of the two cases. The brute force algorithm is O(N) time complexity for a regular computer and $O(\sqrt{N})$ for a quantum computer.

The process of signing is next described. The secret key S, random array R, hash H and public key P are used in a matrix form in the signing algorithm. First, the hash H is prepared. The hash H can be presented in the form of matrices $H^{(2)}$ and $H^{(1)}$ of integer numbers $0 \leq h_i^{(1,2)} \leq 2^{2L}$ as follows:

$$H_n^{(2)} = \begin{vmatrix} h_{4n-3}^{(2)} & h_{4n-2}^{(2)} \\ h_{4n-1}^{(2)} & h_{4n}^{(2)} \end{vmatrix} \tag{13}$$

$$h_{4n-3}^{(2)} = h_n h_{n+2} \tag{14}$$

$$h_{4n-2}^{(2)} = h_{n+1} h_{n+2}$$

$$h_{4n-1}^{(2)} = h_n h_{n+3}$$

$$h_{4n}^{(2)} = h_{n+1} h_{n+3}$$

$$H_n^{(1)} = \begin{vmatrix} h_{4n-3}^{(1)} & h_{4n-2}^{(1)} \\ h_{4n-1}^{(1)} & h_{4n}^{(1)} \end{vmatrix} \tag{15}$$

$$h_k^{(1)} = h_{4n-3}^{(2)} \tag{16}$$

$$h_{k+1}^{(1)} = h_{4n-3}^{(2)}$$

$$h_{k+2}^{(1)} = h_{4n-2}^{(2)}$$

$$h_{k+3}^{(1)} = h_{4n}^{(2)}$$

$$k = (4n+1) \bmod 4N, \, n = 1, N \tag{17}$$

Next, the secret key is prepared. The array D is used for forming array X so that so that the matrices $X^{(1)}$ and $X^{(2)}$ are singular.

$$D = \{d_n^{(1)}, d_n^{(2)}\}_{n=1}^{4N}, \, 1 < d_i^{(1)}, d_i^{(2)} < 2^L \tag{18}$$

$$X = \{x_n^{(1)}, x_n^{(2)}\}_{n=1}^{4N}, \, 1 < x_i^{(1)}, x_i^{(2)} < 2^L \tag{19}$$

$$X_n^{(i)} = \begin{vmatrix} x_{4n-3}^{(i)} & x_{4n-2}^{(i)} \\ x_{4n-1}^{(i)} & x_{4n}^{(i)} \end{vmatrix}, \, = i = 1, 2, \, n = 1, N \tag{20}$$

$$x_{4n-3}^{(i)} = d_{4n-3}^{(i)} d_{4n-1}^{(i)} \tag{21}$$

$$x_{4n-2}^{(i)} = d_{4n-2}^{(i)} d_{4n-1}^{(i)}$$

$$x_{4n-1}^{(i)} = d_{4n-3}^{(i)} d_{4n}^{(i)}$$

$$x_{4n}^{(i)} = d_{4n-2}^{(i)} d_{4n}^{(i)}$$

The condition of singularity is fulfilled automatically due to the following equalities:

$$x_{4n}^{(i)} = \frac{x_{4n-2}^{(i)} x_{4n-1}^{(i)}}{x_{4n-3}^{(i)}}, \, n = 1, N, \, i = 1,2 \tag{22}$$

The secret key S with the length $n_p = 7N$ comprises the areas of X and A.

$$S = \{s_n\}_{n=1}^{7N} \tag{23}$$

$$A = \{a_n\}_{n=1}^{3N} \tag{24}$$

Accordingly, it can be seen that:

$$s_n = a_n, n = 1, 3N$$

$$s_n = x_n^{(1)}, n = 3N+1, 7N$$

$$s_i = x_i^{(2)}, i = 3N+1, 7N \tag{25}$$

Next, a public key is prepared. The matrix X, is calculated as follows:

$$X_n = X_n^{(1)} X_n^{(2)}, \, n = 1, N \tag{26}$$

$$X_n = \begin{vmatrix} x_{4n-3} & x_{4n-2} \\ x_{4n-1} & x_{4n} \end{vmatrix}, \, n = 1, N \tag{27}$$

The array of random numbers R is used for forming the array W and corresponding matrices $W_n^{(1)}$ and $W_n^{(2)}$ (n=1, N).

$$R = \{r_n\}_{n=1}^{3N}, \, 0 < r_i < 2^L \tag{28}$$

$$W = \{w_1^{(1)}, w_2^{(2)}\}, \, 0 < w_i^{(1)}, w_i^{(2)} < 2^L \tag{29}$$

$$W_n^{(i)} = \begin{vmatrix} w_{4n-3}^{(i)} & w_{4n-2}^{(i)} \\ w_{4n-1}^{(i)} & w_{4n}^{(i)} \end{vmatrix}, \, i = 1, 2 \tag{30}$$

$$\begin{vmatrix} w_{4n-3}^{(1)} & w_{4n-2}^{(1)} \\ w_{4n-1}^{(1)} & w_{4n}^{(1)} \end{vmatrix} = \begin{vmatrix} a_{3n-2} & a_{3n-1} \\ r_{3n-2} & r_{3n-1} \end{vmatrix}, \, n = 1, N \tag{31}$$

$$\begin{vmatrix} w_{4n-3}^{(2)} & w_{4n-2}^{(2)} \\ w_{4n-1}^{(2)} & w_{4n}^{(2)} \end{vmatrix} = \begin{vmatrix} a_{3n} & r_{3n} \\ a_{3n+1} & r_{3n+1} \end{vmatrix}, \, n = 1, N-1 \tag{32}$$

$$\begin{vmatrix} w_{4N-3}^{(2)} & w_{4N-2}^{(2)} \\ w_{4N-1}^{(2)} & w_{4N}^{(2)} \end{vmatrix} = \begin{vmatrix} a_{3N} & r_{3N} \\ a_1 & r_1 \end{vmatrix} \tag{33}$$

The matrices $Y_n^{(1)}$ and $Y_n^{(2)}$ (n=1,N) as given below are the result of the calculations in equations (35) through (38).

$$Y_n^{(i)} = \begin{vmatrix} y_{4n-3}^{(i)} & y_{4n-2}^{(i)} \\ y_{4n-1}^{(i)} & y_{4n}^{(i)} \end{vmatrix}, \, i = 1,2 \tag{34}$$

$$Y_n^{(1)} = W_n^{(1)} X_n^{(1)} \tag{35}$$

$$\begin{vmatrix} y_{4n-3}^{(1)} & y_{4n-2}^{(1)} \\ y_{4n-1}^{(1)} & y_{4n}^{(1)} \end{vmatrix} = \begin{vmatrix} a_{3n-2} & a_{3n-1} \\ r_{3n-2} & r_{3n-1} \end{vmatrix} \begin{vmatrix} x_{4n-3}^{(1)} & x_{4n-2}^{(1)} \\ x_{4n-1}^{(1)} & x_{4n}^{(1)} \end{vmatrix} \tag{36}$$

$$Y_n^{(2)} = X_n^{(2)} W_n^{(2)} \tag{37}$$

$$\begin{vmatrix} y_{4n-3}^{(2)} & y_{4n-2}^{(2)} \\ y_{4n-1}^{(2)} & y_{4n}^{(2)} \end{vmatrix} = \begin{vmatrix} x_{4n-3}^{(2)} & x_{4n-2}^{(2)} \\ x_{4n-1}^{(2)} & x_{4n}^{(2)} \end{vmatrix} \begin{vmatrix} a_{3n} & r_{3n} \\ a_{3n+1} & r_{3n+1} \end{vmatrix}, \, n = 1, N-1 \tag{38}$$

$$\begin{vmatrix} y_{4N-3}^{(2)} & y_{4N-2}^{(2)} \\ y_{4N-1}^{(2)} & y_{4N}^{(2)} \end{vmatrix} = \begin{vmatrix} x_{4N-3}^{(2)} & x_{4N-2}^{(2)} \\ x_{4N-1}^{(2)} & x_{4N}^{(2)} \end{vmatrix} \begin{vmatrix} a_{3N} & r_{3N} \\ a_1 & r_1 \end{vmatrix}$$

The matrix $Y_n$ is obtained as follows:

$$Y_n = Y_n^{(1)} Y_n^{(2)}, \, n = 1, N \tag{39}$$

$$Y_n = \begin{vmatrix} y_{4n-3} & y_{4n-2} \\ y_{4n-1} & y_{4n} \end{vmatrix}, \, n = 1, N \tag{40}$$

The public key P with the length $n_s = 5N$ comprises the calculation result using arrays X and A. For n=1, N−1:

$$p_n = y_{4n-3} = (a_{3n-2} x_{4n-3}^{(1)} + a_{3n-1} x_{4n-1}^{(1)})(a_{3n} x_{4n-3}^{(2)} + a_{3n+1} x_{4n-2}^{(2)}) + \tag{41}$$
$$(a_{3n-2} x_{4n-2}^{(1)} + a_{3n-1} x_{4n}^{(1)})(a_{3n} x_{4n-1}^{(2)} + a_{3n+1} x_{4n}^{(2)})$$

$$p_N = y_{4N-3} = (a_{3N-2} x_{4N-3}^{(1)} + a_{3N-1} x_{4N-1}^{(1)})(a_{3N} x_{4N-3}^{(2)} + a_1 x_{4N-2}^{(2)}) +$$
$$(a_{3N-2} x_{4N-2}^{(1)} + a_{3N-1} x_{4N}^{(1)})(a_{3N} x_{4N-1}^{(2)} + a_1 x_{4N}^{(2)})$$

For n=1, N:

$$p_{4n+N-3} = x_{4n-3} = x_{4n-3}^{(1)} x_{4n-3}^{(2)} + x_{4n-2}^{(1)} x_{4n-1}^{(2)}$$

$$p_{4n+N-2} = x_{4n-2} = x_{4n-3}^{(1)} x_{4n-2}^{(2)} + x_{4n-2}^{(1)} x_{4n}^{(2)}$$

$$p_{4n+N-1}=x_{4n-1}=x_{4n-1}^{(1)}x_{4n-3}^{(2)}+x_{4n}^{(1)}x_{4n-1}^{(2)}$$

$$p_{4n+N}=x_{4n}=x_{4n-1}^{(1)}x_{4n-2}^{(2)}+x_{4n}^{(1)}x_{4n}^{(2)} \quad (42)$$

Note that $y_{4n-2}$, $y_{4n-2}$, $y_{4n-2}$ are not included into the public key P because they include random parameters $r_i$.

The signing process is next described. The matrices $Z_n^{(1)}$ and $Z_n^{(2)}$ (n=1, N) as shown in equations (43) and (44) are result of the calculations in equations (45) and (46).

$$Z_n^{(1)} = \begin{vmatrix} z_{4n-3}^{(1)} & z_{4n-2}^{(1)} \\ z_{4n-1}^{(1)} & z_{4n}^{(1)} \end{vmatrix} \quad (43)$$

$$Z_n^{(2)} = \begin{vmatrix} z_{4n-3}^{(2)} & z_{4n-2}^{(2)} \\ z_{4n-1}^{(2)} & z_{4n}^{(2)} \end{vmatrix} \quad (44)$$

$$Z_n^{(1)} = H_n^{(1)} W_n^{(1)} \quad (45)$$

$$Z_n^{(2)} = W_n^{(2)} H_n^{(2)} \quad (46)$$

Then the signer sends the array Z given in equation (47), the array extracted from $Y_n$ given in equation (48), and the message M to a verifier.

$$Z=\{z_n^{(1)},z_n^{(2)}\}_{n=1}^{4N}, 1<z_i^{(1)},z_i^{(2)}<2^L \quad (47)$$

$$\{y_{4n-2},y_{4n-1},y_{4n}\}_{n=1}^{N} \quad (48)$$

The process of verification is next described. The public key P is used to verify that the array Z is correctly follows from the message M. The hash H is calculated as described above, and the verifier obtains the matrices $H_n^{(1)}$ and $H_n^{(2)}$. The verification result is successful if equation (49) is fulfilled.

$$H_n^{(1)}Y_nH_n^{(2)}=Z_n^{(1)}X_nZ_n^{(2)} \quad (49)$$

Consider an example where L=16. Multiplying the equations (41) and (42) yields equation (50):

$$H_n^{(1)}W_n^{(1)}W_n^{(2)}H_n^{(2)}=Z_n^{(1)}Z_n^{(2)} \quad (50)$$

The message exchange method described above is not resistant against the man-in-the-middle attack (MITM) because neither Alice nor Bob have any authentication information about each other. In order to set the message exchange process resistant against MITM, an authentication transaction process is added to the message exchange method.

Assume that Alice wants to pass the secret message $M_1$ to Bob using Ed for the authentication procedure. Similarly, Bob wants to pass the secret message $M_4$ to Alice using Ed.

From Alice's part, the process includes generating the following numbers: secret key $S_A$, public key $P_A$, random $A_s$ and $A_r$. $S_A$, $P_A$, $A_s$, $A_r \in N$.

From Bob's parts, the process includes generating the following numbers: secret key $S_B$, public key $P_B$, random $B_s$ and $B_r$. $S_B$, $P_B$, $B_s$, $B_r \in N$.

From Ed's part, for the authentication transaction between Alice and Bob, the process includes the number $C_A$ and $C_B$ as a result of equation (51):

$$B_r=A_s \oplus C_A$$

$$A_r=B_s \oplus C_B \quad (51)$$

Figure 3:
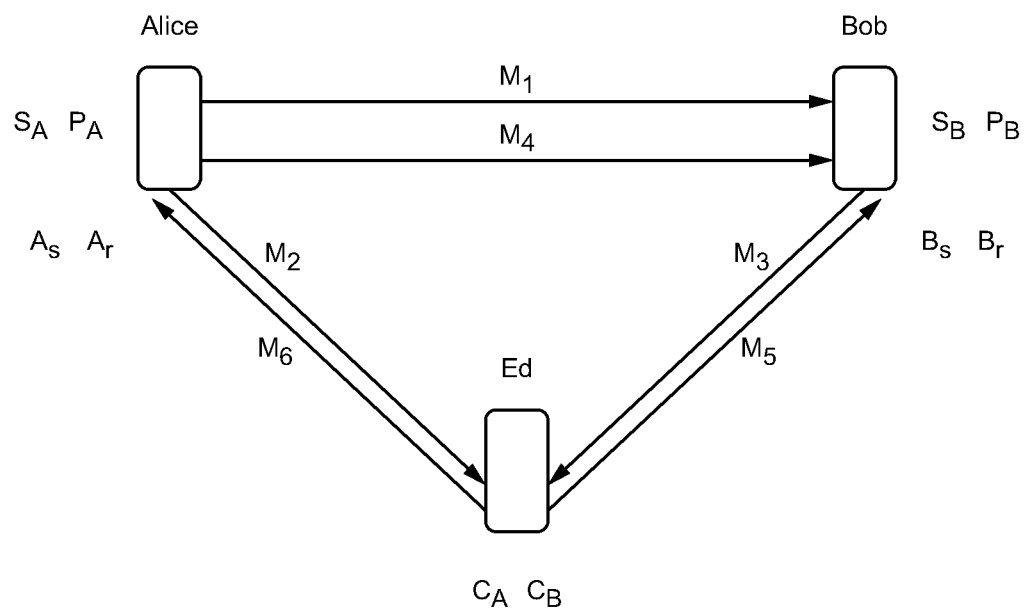
FIG. 3 illustrates an example message transfer process with authentication transaction identifications according to one or more embodiments.

FIG. 3 illustrates the message transfer process with authentication transaction identifications on the "Ed" side.

Message exchange forming will next be discussed. Alice wants to send a secret message $X_A$ to Bob. The process includes the generation of random variable $G_A$ on Alice's part. The messages $M_1$ and $M_2$ are a result of the calculations of equation (52).

$$M_1=X_A \oplus G_A$$

$$M_2=A_s \oplus G_A \quad (52)$$

The message transfer process with authentication transaction identifications on the "Ed" side is shown in equation (53).

$$M_3=M_2 \oplus C_A=A_s \oplus G_A \oplus C_A \quad (53)$$

Bob receives messages $M_2$ and $M_3$ from Alice and Ed respectively. Bob applies the value $B_r$ to obtain $G_A$ as follows in equation (54).

$$G_A=M_3 \oplus B_r=A_s \oplus G_A \oplus C_A \oplus B_r \quad (54)$$

The message $M_1$ are signed by Alice using secret key $S_A$. Bob can check Alice's signature using public key $P_A$. A similar process is used if Bob wants to send a secret message $X_B$ to Alice. The process includes the generation of random variable $G_B$ on Bob's part. The messages $M_4$ and $M_5$ are a result of the following calculations in equation (55).

$$M_4=X_B \oplus G_B$$

$$M_5=B_s \oplus G_B \quad (55)$$

The message transfer process with authentication transaction identifications on the "Ed" side is modeled in equation (56).

$$M_6=M_5 \oplus C_B=B_s \oplus G_B \oplus C_B \quad (56)$$

Alice receives messages $M_5$ and $M_6$ from Bob and Ed respectively. The value $A_r$ is applied to obtain $G_B$ as follows in equation (57):

$$G_B=M_6 \oplus A_r=B_s \oplus G_B \oplus C_B \oplus A_r \quad (57)$$

The message $M_4$ is signed by Bob using secret key $S_B$. Alice can verify Bob's signature using public key $P_B$.

The user registration process is next described. The process below defines the registration procedure of Alice and Bob (or any other user in the system). The registration process is performed before participating in any data exchange. The registration process comprises generation of an authentication transaction value Ca on Alice's (user's) side and delivering an authentication transaction value to server ("Ed" side).

An authentication transaction value is generated. An authentication transaction value Ca is taken as a random value (a byte sequence), which is generated and stored on user's side.

The authentication transaction value is then delivered to a server ("Ed" side). This step includes delivery of an authentication transaction value Ca and storing this value in server records.

Figure 4:
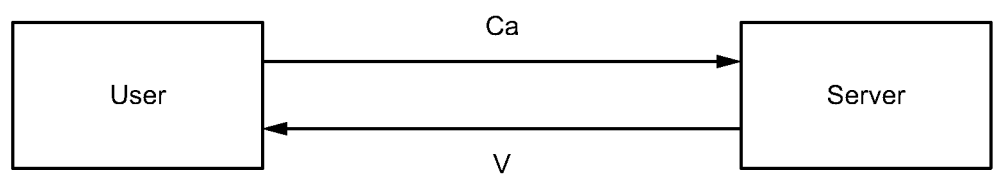
FIG. 4 illustrates a scenario for sending an authentication transaction value to a server and validating the delivery according to one or more embodiments.

FIG. 4 illustrates a scenario for sending an authentication transaction value to a server and validating the delivery. To deliver the Ca value and verify that the server received it, Alice knows a server public key Ps. A server public key Ps may be included into Alice's source code (making it initially known to Alice and immutable). A corresponding server key is Ss, which is known to the server only. To deliver the Ca value to server ("Ed"), Alice performs the next steps: (1) sending the Ca value to server ("Ed"), and (2) confirming Ca delivery by verifying the server signature and result.

V is calculated on a server side as follows:

$$H=\text{hash}(Ca) \quad (58)$$

$$V=\text{SIGN}(H,Ss) \quad (59)$$

Where: hash is a cryptographic hash function, Ca is an authentication transaction value, and SIGN is a cryptographic signature function.

Alice calculates and verifies Ha=H as follows:

$$Ha = \text{hash}(Ca) \quad (60)$$

$$H = Ha? \quad (61)$$

If the value of H does not equal value of Ha the verification procedure terminates with error.

Next, Alice verifies the signature of H using the embedded Ps key. If the signature verification was unsuccessful, the verification procedure terminates with error. Otherwise, the procedure continues.

The Ca value is stored locally (on Alice's side). Once Alice verified Ca delivery, it is safe to store the Ca value locally.

Then, Ed stores the received Ca value locally on its side.

The inverse matrix $X^{-1}$ of matrix $$X = \begin{vmatrix} x_1 & x_2 \\ x_3 & x_4 \end{vmatrix}$$

is defined as follows $$X^{-1} = \frac{\begin{vmatrix} x_4 & -x_2 \\ -x_3 & x_1 \end{vmatrix}}{x_1 x_4 - x_2 x_3} \text{ and}$$

$$XX^{-1} = X^{-1}X = I$$

where I is the identity matrix, $$I = \begin{vmatrix} 1 & 0 \\ 0 & 1 \end{vmatrix}.$$

In linear algebra and matrix mathematics, a centrosymmetric matrix is a matrix which is symmetric about its center. A centrosymmetric matrix A has the following form:

$$A = \begin{vmatrix} a_1 & a_2 \\ a_2 & a_1 \end{vmatrix}$$

Centrosymmetric matrices A and B satisfy the following conditions: AB=BC.

A square matrix is singular if and only if its determinant is 0.

The matrix $$X = \begin{vmatrix} x_1 & x_2 \\ x_3 & x_4 \end{vmatrix}$$

is singular if the determinant of the matrix X, det(X)=0 (e.g., $x_1 x_4 - x_2 x_3 = 0$). If the matrix X is singular, the matrix B=AX is also singular.

Consider a singular matrix S and an invertible, nondegenerate, or non-singular matrix V. The matrix W is also singular as a result of SV=W. The singular matrix S can be obtained if the matrices V and W are known, because $S = WV^{-1}$, but the non-singular matrix $V = S^{-1}W$ is not obtained even if matrices S and W are known because the inverse matrix $S^{-1}$ does not exist (division by zero). In this sense, there is no unique solution of the equation (ambiguity).

The authentication system 100 can include at least one processing circuit. Such a processing circuit can include, for example, one or more processors and one or more storage devices that are coupled to a local interface. The local interface can include, for example, a data bus with an accompanying address/control bus or any other suitable bus structure. Similarly, each of the computing devices 160-164 can include at least one processing circuit. Such a processing circuit can include, for example, one or more processors and one or more storage devices that are coupled to a local interface.

The storage devices for a processing circuit can store data or components that are executable by the processors of the processing circuit. For example, the authentication engine 132, the cryptography engine 182, the cryptography engine 192, and/or other components can be stored in one or more storage devices and be executable by one or more processors in the authentication system 100, the computing device 160, and the computing device 161.

The authentication engine 132, the cryptography engine 182, the cryptography engine 192, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium memory device for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the authentication engine 132, the cryptography engine 182, the cryptography engine 192, and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

Figure 5:
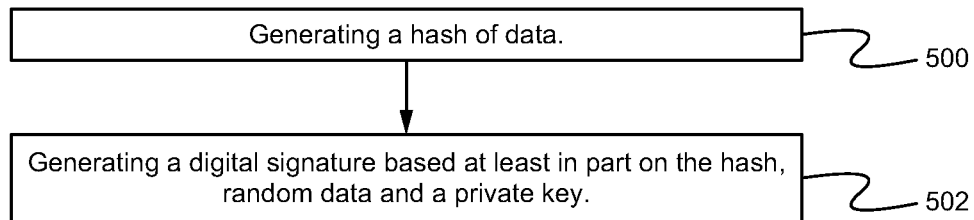
FIG. 5 illustrates a flowchart of a method of generating a digital signature for data according to some embodiments.

FIG. 5 illustrates a flowchart of a method of generating a digital signature for data according to some embodiments. In the step 500, a hash of data is generated. The hash is able to include a first set of singular matrices. In the step 502, a digital signature is generated based at least in part on the hash, random data and a private key. The random data is able to be a first set of regular matrices. The private key is able to be a second set of singular matrices. The digital signature is able to correspond to a set of matrices. The digital signature is able to correspond to a Diophantine second order equation. In some embodiments, fewer or additional steps are implemented. For example, the digital signature is able to be verified based at least in part on a public key of singular matrices. In another example, a signer user is able to be registered with an authentication server by generating an authentication transaction value and sending the authentication transaction value to the authentication server. In another example, a server digital signature and a hash of the authentication transaction value are received from the authentication server, and the server digital signature and the hash of the authentication transaction value are verified. In some embodiments, the order of the steps is modified.

Figure 6:
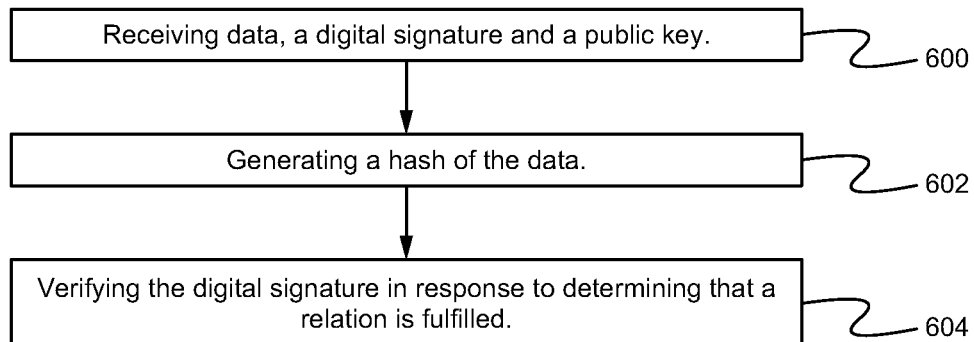
FIG. 6 illustrates a flowchart of a method of verifying a digital signature for data according to some embodiments.

FIG. 6 illustrates a flowchart of a method of verifying a digital signature for data according to some embodiments. In the step 600, data, a digital signature and a public key are received. The public key is able to include singular matrices. In the step 602, a hash of the data is generated. The hash is able to include singular matrices. In the step 604, the digital signature is verified in response to determining that a relation is fulfilled (e.g., $H_n^{(1)}Y_nH_n^{(2)}=Z_n^{(1)}X_nZ_n^{(2)}$. In some embodiments, fewer or additional steps are implemented. For example, an authentication message is received for the data from an authentication server. In some embodiments, the order of the steps is modified.

Figure 7:
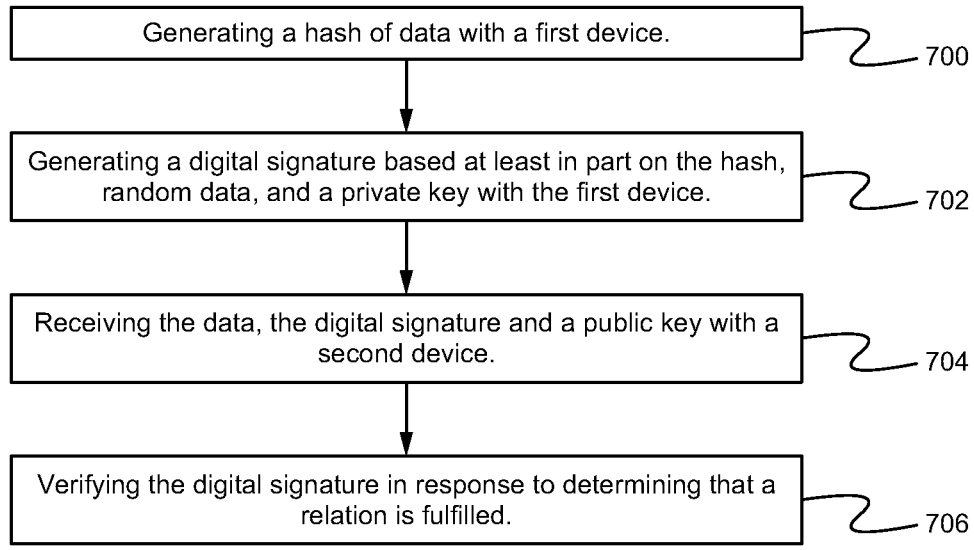
FIG. 7 illustrates a flowchart of a method of implementing an authentication process with an exposed and unregistered public certificate according to some embodiments.

FIG. 7 illustrates a flowchart of a method of implementing an authentication process with an exposed and unregistered public certificate according to some embodiments. In the step 700, a first device generates a hash of data. In the step 702, the first device generates a digital signature based at least in part on the hash, random data, and a private key. The public key includes a first set of singular matrices. The digital signature corresponds to a set of matrices. The random data includes a first set of regular matrices, and the private key includes a second set of singular matrices and a second set of regular matrices. The hash includes a third set of singular matrices. In the step 704, a second device receives the data, the digital signature, and a public key. In the step 706, the second device verifies the digital signature in response to determining that a relation is fulfilled. The relation is $H_n^{(1)}Y_nH_n^{(2)}=Z_n^{(1)}X_nZ_n^{(2)}$. The digital signature corresponds to a relation which corresponds to a Diophantine second order equation. In some embodiments, fewer or additional steps are implemented. For example, an authentication message for the data is received from an authentication server. In another example, the device for receiving the data is registered. Registering the device includes generating an authentication transaction value. In another example, a signer user is registered with an authentication server by generating an authentication transaction value and sending the authentication transaction value to the authentication server. In another example, a server digital signature and a hash of the authentication transaction value from the authentication server are received, and the server digital signature and the hash of the authentication transaction value are verified. In some embodiments, the order of the steps is modified.

Figure 8:
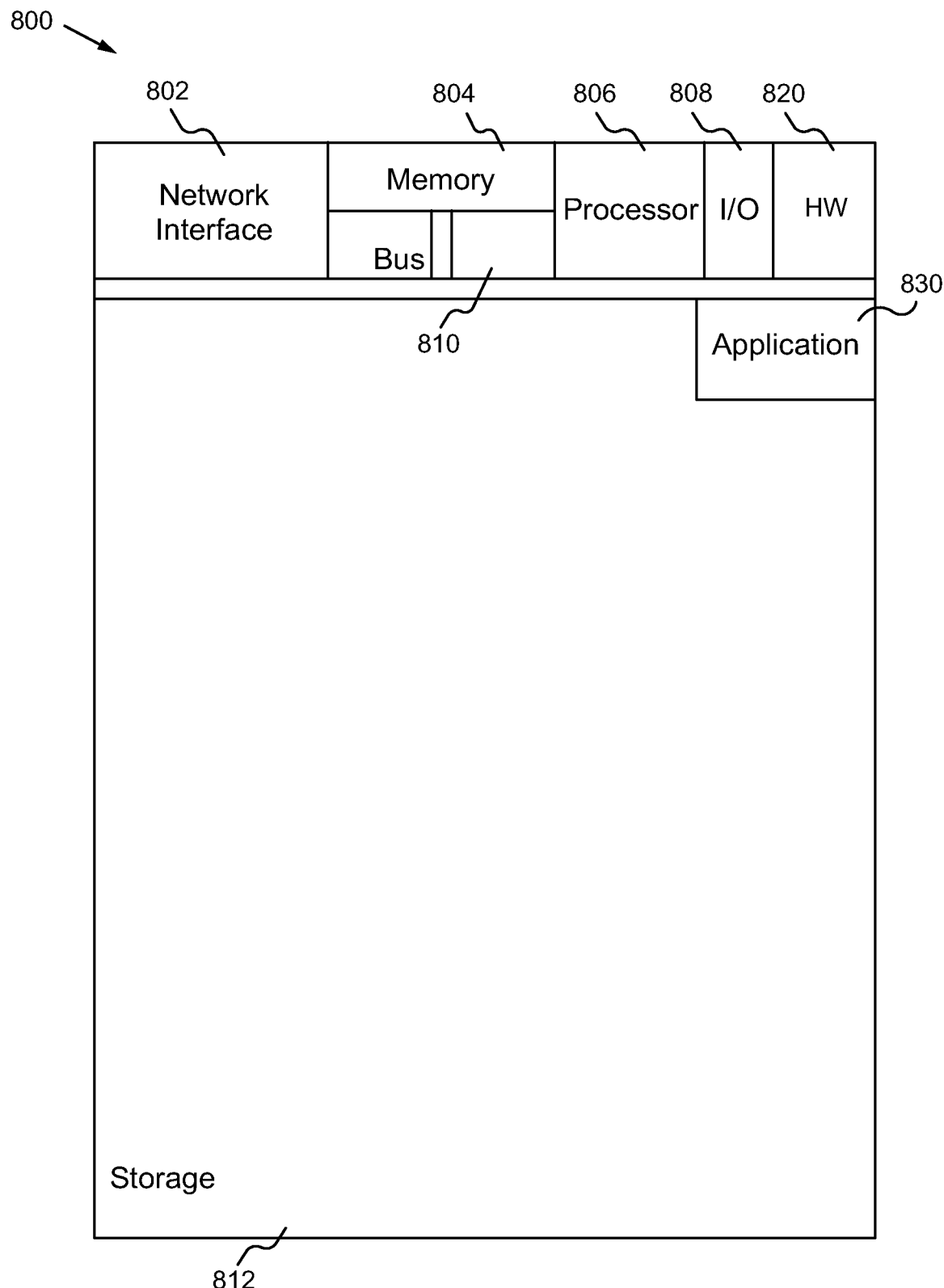
FIG. 8 illustrates a block diagram of an exemplary computing device configured to implement the digital signature method according to some embodiments.

FIG. 8 illustrates a block diagram of an exemplary computing device configured to implement the authentication system according to some embodiments. The computing device 800 is able to be used to acquire, store, compute, process, communicate and/or display information such as images and videos including 3D content. The computing device 800 is able to implement any of the encoding/decoding aspects. In general, a hardware structure suitable for implementing the computing device 800 includes a network interface 802, a memory 804, a processor 806, I/O device(s) 808, a bus 810 and a storage device 812. The choice of processor is not critical as long as a suitable processor with sufficient speed is chosen. The memory 804 is able to be any conventional computer memory known in the art. The storage device 812 is able to include a hard drive, CDROM, CDRW, DVD, DVDRW, High Definition disc/drive, ultra-HD drive, flash memory card or any other storage device. The computing device 800 is able to include one or more network interfaces 802. An example of a network interface includes a network card connected to an Ethernet or other type of LAN. The I/O device(s) 808 are able to include one or more of the following: keyboard, mouse, monitor, screen, printer, modem, touchscreen, button interface and other devices. Authentication application(s) 830 used to implement the authentication system are likely to be stored in the storage device 812 and memory 804 and processed as applications are typically processed. More or fewer components shown in FIG. 8 are able to be included in the computing device 800. In some embodiments, authentication hardware 820 is included. Although the computing device 800 in FIG. 8 includes applications 830 and hardware 820 for the authentication system, the authentication method is able to be implemented on a computing device in hardware, firmware, software or any combination thereof. For example, in some embodiments, the authentication applications 830 are programmed in a memory and executed using a processor. In another example, in some embodiments, the authentication hardware 820 is programmed hardware logic including gates specifically designed to implement the authentication system.

In some embodiments, the authentication application(s) 830 include several applications and/or modules. In some embodiments, modules include one or more submodules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

The architecture described herein includes the concept of network endpoints and devices being registered (onboarded) onto the authentication server system. Client software embedded onto endpoint systems work in conjunction with the authentication server and additional security technologies including digital signatures, key agreement and encapsulation and encryption techniques to generate a completely comprehensive and secure network.

The system is composed of several major processes:

Registration and authentication of endpoint systems. Registration and authentication manage the identification and security of endpoint systems for network access.

Point-to-Point connection authentication. Incoming network connection requests from endpoints which are not registered to the authentication server and are therefore are rejected. This includes several layer 2-7 protocols including low-level management network functions such as ICMP, DHCP and ARP.

Endpoint-to-endpoint network traffic is optionally protected using any of several techniques using shared key agreements. This supports payload encryption, packet tampering protection, eavesdropping and network tapping prevention, system masquerading and spoofing, man-in-the-middle attacks and guaranteed payload integrity.

In some embodiments, authentication is required on only incoming connections. This allows support for network broadcast and multicast traffic.

Figure 9:
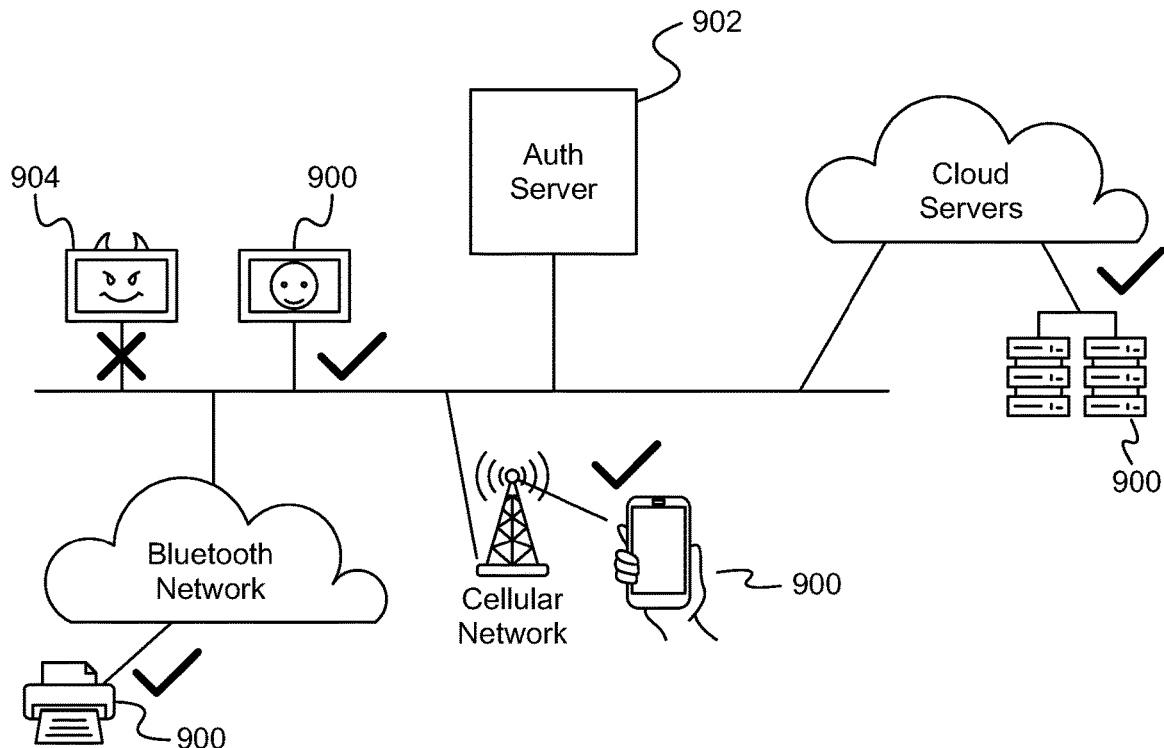
FIG. 9 illustrates a diagram of an architecture of a system to secure endpoints across various network LAN and WAN infrastructures according to some embodiments.

FIG. 9 illustrates a diagram of an architecture of a system to secure endpoints across various network LAN and WAN infrastructures according to some embodiments.

The system secures endpoints 900 across various network LAN and WAN infrastructures.

The endpoints 900 may be almost any network connected devices from large cloud systems and local servers, to desktops, printers, smartphones and even tiny IoT devices distributed over wireless network links. The endpoints 900 include any network-connected target computer systems from tiny IoT devices to large computers. An authentication server 902 is a centralized system which is populated with endpoint systems. A public name is the clear text name which is used to uniquely identify the endpoint system. This will often be a network address or network node name. A secret name is a unique endpoint system name which is encrypted before being exposed. Since network names such as addresses can be easily spoofed, the secret name is kept secret and encrypted when sent across the network. Only the endpoints and the authentication server have the decryption secret key to decrypt and view this secret endpoint name. A secret key is a unique encryption key which is generated and shared between each endpoint system and the authentication server. The secret key can be shared across insecure networks without ever exposing the key contents. The system prevents MAC spoofing, Man in the Middle/Replay attacks, impersonation and trespassing.

Registration

Each software or device endpoint is registered to the authentication server when onboarding to private networks. Registered devices can be authorized to communicate with each other, and bad actor systems 904 will not be able to engage or interoperate with other authorized endpoints.

Onboarding systems into networks protected by authentication server domains is performed by an authorized administrator or protected embedded system. Examples of embedded systems include IoT gateway and manager systems.

The new endpoint and the authentication server perform a secret key exchange. This will implement a shared key structure to support communications using symmetric encryption operations. The secret key exchange is performed on both the new system and on the authentication server(s). The secret key is randomized and designed to prevent duplicate collisions. The key size is at least 256 bits to guarantee quantum resistance in subsequent operations.

The secret key is refreshed, replacing the keys on both ends. The secret keys are stored inside system HSM hardware. Each endpoint system being authorized is assigned a unique name. The unique name is designed to be unique on the network. Secrecy of the unique name is not required. The unique name is stored in the Authentication Server and used to identify each endpoint.

Authentication

For any endpoint-to-endpoint network communications, each incoming network connection is authorized. Non-authorized endpoint systems attempting to perform a network connection are rejected.

Software installed on each endpoint systems contain a cached list of other authorized endpoints. Incoming network connections are compared with the local authorized systems managed by the authentication server.

If the incoming connection is from an endpoint not in the local endpoint cached list, this node queries the authentication server to authorize the incoming connection.

If the incoming node name exists, the authentication server returns an acknowledgement record. The acknowledgment record is then added to the endpoint local authorized nodes list and the connection is completed, and network traffic is allowed.

If the incoming node is not registered in the authentication server, the network connection is rejected by dropping the packet. Dropping the packet and not responding makes the endpoint "dark" on the network and not vulnerable to low-level network scans.

The authentication server logs the failed connection attempt. This can be directed to log management systems to detect suspicious network incidents.

The local endpoint authorized records list contains a Time-to-Live (TTL) value and periodically expires the record. Connections from this node involve re-authentication. The authorization refresh can be configured and increases the security level in possible cases where endpoint systems are possibly compromised.

Authentication Server

Server administration for the authentication server is managed directly by human or automated system administrators. In some cases, endpoint registration may be ingested from other network management systems.

In some use case scenarios, the authentication server may be an embedded system. For example, the authentication server is able to be embedded into the dashboard computer electronics controlling autonomous vehicles and IoT devices.

For authentication servers residing on public WAN networks, the server should be protected by standard TLS PKI systems using public/private certificates. This protects the authentication server from external security attacks including man-in-the-middle and other impersonation attacks.

Secret Key Exchange

Figure 10:
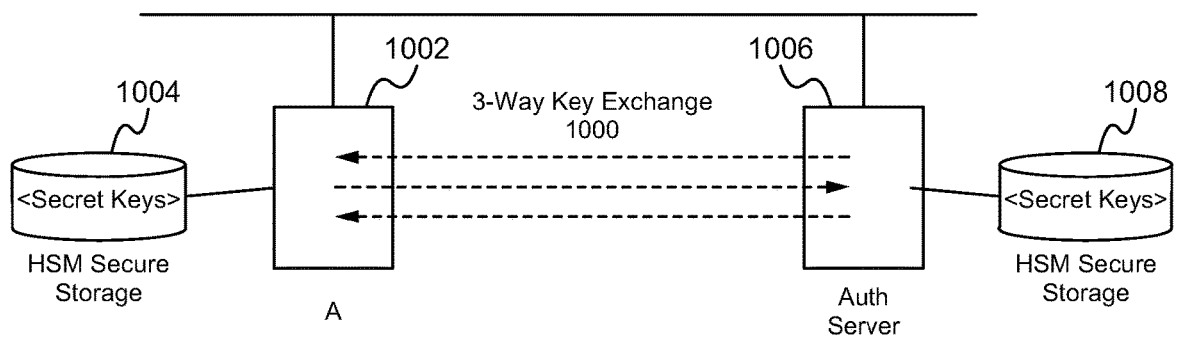
FIG. 10 illustrates a diagram of an architecture of a system to perform a 3-way key exchange according to some embodiments.

FIG. 10 illustrates a diagram of an architecture of a system to perform a 3-way key exchange according to some embodiments.

The libraries contain a technology (both high-performance proprietary and other NIST standards) which perform quantum resistant secret key exchanges over unsecure public networks. A key agreement is a 3-way key exchange protocol 1000, where two endpoint systems (1002, 1006) share secret data over a 3-way data exchange protocol 1000.

At the end of the key exchange, both systems have identical secret keys (1004, 1008). During the exchange, the key is never exposed.

The keys on both systems are not exposed, so they are stored securely. This is similar to private certificate management in standard PKI practices. This is typically done using HSM hardware which is hardware backed secure storage. Examples of this technology include: FIPS hardware, TPM embedded systems, and others.

Hardware Security Modules (HSMs) are hardened, tamper-resistant hardware devices that strengthen encryption practices by generating keys, encrypting and decrypting data, and generating and verifying digital signatures.

Encrypted Communications Protocol

The communication between endpoints and other endpoints or the authentication server does not expose sensitive data elements. Security sensitive data, such as the endpoint database keys are encrypted using the shared secret keys (which are never exposed). Endpoints can communicate with other endpoints or with the authentication server securely, even over public networks.

For some high-security environments, the data communications between systems can be further encrypted using symmetrical encryption technologies, such as AES or other encryption technologies. These encryption methods can use the existing shared secret keys established.

The technology has been optimized for high-speed LAN network segments using XOR encryption techniques. For WAN environments including the Internet, AES is not a noticeable performance issue.

Periodic Refresh

The shared keys are periodically refreshed with new keys. The refresh is performed to increase security by prevention of data from being harvested and attacked by external systems.

Packet Payload Encryption

Using endpoint to endpoint shared keys, the packet payload data can be encrypted with quantum resistant methods. This prevents eavesdropping of network traffic.

The technique can be performed at the datalink layers (e.g., Ethernet or Bluetooth), or at higher network layers such as IP packets.

Packet CRC/Hash Encryption

Another level of security is available to guarantee data integrity is using a technique where only interpacket CRC or other hashes only are encrypted.

This will guarantee data has not been tampered or altered. The advantages of this method are that it generates minimal performance overhead, but prevents packet data from being tampered with and from man-in-the-middle type attacks.

System Registration Protocol

Before endpoint systems can be allowed to communicate with other registered endpoints, each endpoint must be securely registered to the authentication server.

Each endpoint system has a public name, a secret name, and Time-To-Live (TTL) data elements.

The authentication server also stores the symmetric secret key for each endpoint.

Each endpoint system must be explicitly registered by an authorized system administrator with the authentication server. The process includes:

Performing a Secret Key exchange between the endpoint system and the Authentication Server. The secret key is stored securely in a key storage methodology on both endpoints. The new endpoint then provides the following data elements: a public name, a secret name and TTL. For Ethernet, a public name may be the MAC address. The secret name is known only by the endpoint and the authentication server. The TTL is provided as a policy by the system administrator. The secret name is a 32 (or more) byte random string. The value can be auto-generated. The secret name is encrypted using an XOR operation with the secret key. This is what will be transmitted to the authentication server. Key to transmit: Secret Name XOR Secret Key. The elements are transferred to the authentication server. The authentication server does not decrypt the secret name but stores the encrypted name.

Figure 11:
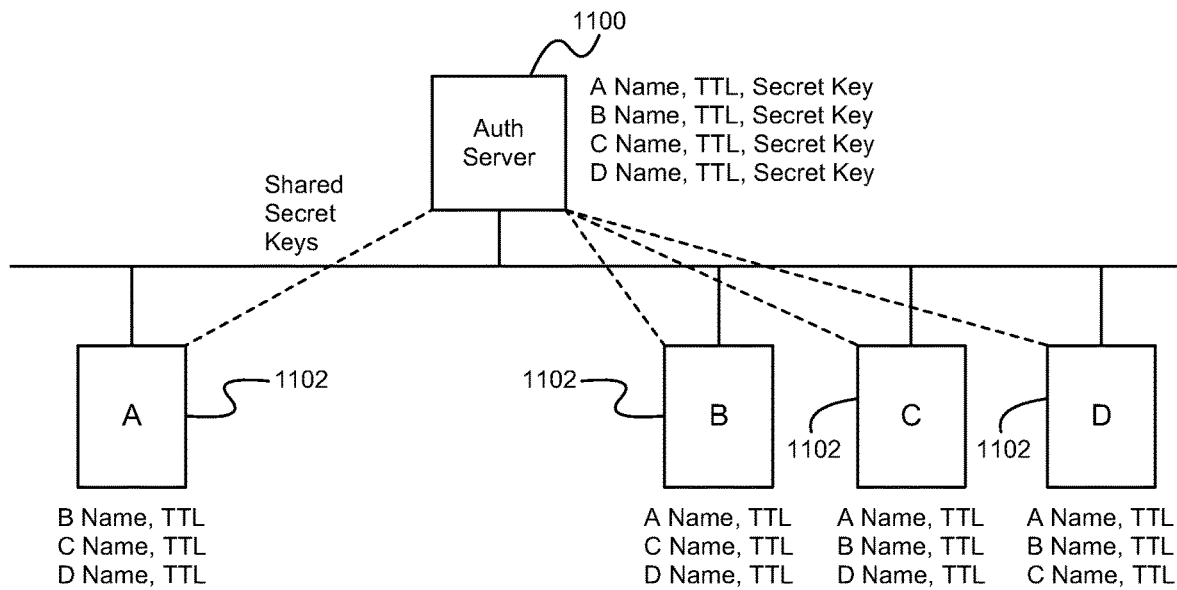
FIG. 11 illustrates a diagram of an authentication server and endpoints according to some embodiments.

FIG. 11 illustrates a diagram of an authentication server and endpoints according to some embodiments. An authentication server 1100 stores public names, TTL and a secret key for each endpoint 1102. Each endpoint 1102 stores the public name of the other endpoints and TTL.

Endpoint Authentication Protocol

Endpoint authentication is the process which authenticates endpoints from incoming network packets, and either authorizes data communications or rejects connection attempts.

When endpoints receive incoming connection requests, the endpoint performs several steps. The source endpoint includes in the connection packet the public endpoint name and a token encrypted with the key shared with the authentication server during onboarding. The target endpoint checks if the source endpoint system is stored on the target endpoint system. This will reside in the target endpoint connection cache data records. If the record exists, the source endpoint will have been authenticated prior against the authentication server, and the target endpoint allows communications to continue. If the record does not exist, the endpoint queries the authentication server to validate if the incoming endpoint is authorized for communications. The public endpoint name and the encrypted token are sent to the authentication server. If the authentication server does not have a record of the incoming endpoint, the authentication server responds with a rejection message. The endpoint then rejects all incoming requests from this unregistered endpoint for a designated time defined by network policies. This prevents Denial of Service-type attacks.

Figure 12:
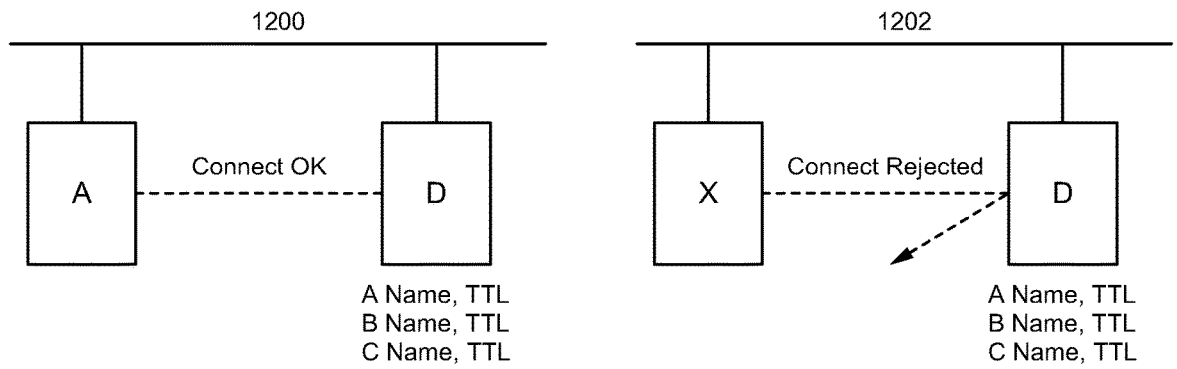
FIG. 12 illustrates a diagram of an accepted connection and rejected connection according to some embodiments.

FIG. 12 illustrates a diagram of an accepted connection and rejected connection according to some embodiments. Based on the steps performed by the endpoint, a connection is able to be accepted 1200 or rejected 1202.

When the authentication server receives the authentication request from endpoints, the authentication server receives: the public name of the endpoint to authenticate and the secret encrypted token of the endpoint to authenticate. Examples of public names may be IP Addresses, Ethernet MAC addresses, Bluetooth addresses, or others, or these names may be user defined for the endpoint. The token is encrypted using the shared encryption key which was generated when the endpoint was onboarded onto the authentication server.

The authentication server then performs a database lookup for the stored public name. If the database record is found, the authentication server: uses the secret symmetric key stored for this endpoint, performs an XOR operation which will decrypt the secret token into a readable form (or potentially other encryption methods, but XOR is extremely compute efficient), and the decrypted token is compared to the token on the authentication server DB associated with the public endpoint name. If the decrypted token is the same as the stored token, the endpoint is considered valid and registered.

XOR Encryption and Decryption

XOR is a common technique to perform secure cryptographic functions with very low resource requirements. Doing an XOR operation includes:

Secret Name: abcde in binary is: 01100001 01100010 01100011 01100100 01100101;

Using a Secret Key of: 01010101 01010101 01010101 01010101 01010101;

The encrypted result is: 11001011 11001000 11001001 11001110 11001111;

When performing the XOR with the secret key again, the resultant is: 01100001 01100010 01100011 01100100 01100101, which is "abcde" in ASCII.

Using large enough keys (e.g., >32 bytes), the technique is extremely difficult to hack using brute force. The technique uses encryption keys that are the same length of the source data, which is appropriate for smaller sized data elements.

Denial of Service Prevention

When an endpoint incoming request is the endpoint is denied by the authentication server, the endpoint system will continue to reject all subsequent connection attempts for a specified time. This is to prevent Denial of Service type of attacks.

If a bad actor endpoint flooded another endpoint(s), and each connection attempt resulted in an authentication request to the authentication server, this would effectively overwhelm the authentication server and cause subsequent network disruptions. The authentication server is an important component of this network architecture and is protected from these kinds of threats.

Network Use Cases

The authentication system is able to use network names such as IP addresses, Ethernet MAC addresses, and various other network infrastructures.

Private networks environments such as LAN segments are able to implement the authentication system.

Public IP networks which can be routed by IP address are able to implement the authentication system. Many Internet networks use technologies which mask internal addresses, and such are not uniquely addressable.

The authentication system is able to be used with Bluetooth, WiFi, IoT, Autonomous Cars, Smart Cities, Metaverse, and other implementations.

Broadcast and Multicast

Since only incoming network connection requests are authenticated, broadcast and multicast traffic are authenticated using the same method. Incoming traffic is from a single endpoint and is processed and authenticated similarly.

Isolated Security Zones

This authentication system can be used to identify scopes of endpoints which are allowed to communicate. These zones can be identified as individual groups, and any groups not allowed to communicate within this group are isolated.

This is a valuable technique to generate secure zones of endpoints which can intercommunicate securely.

The method described herein is able to be implemented in a LAN environment. A LAN is able to include switches, routers, gateways, and other networking equipment. When a device attempts to communicate with another device in the LAN, several steps are performed. Initially, registration or pre-registration occurs. All of the nodes of the LAN are registered. Secret key exchange (using HSM, TPN, other hardware) is implemented as described herein. If a secret key exchange fails, then the communication is blocked (e.g., using XOR verification). Once a node is verified (pre-authorized), the process of verification is not performed again, and a node is able to communicate with another node (e.g., by using a pre-authenticated token).

To utilize the authentication system, a device sends or receives data using a Diophantine system. The authentication system is able to be implemented with user assistance or automatically without user involvement.

In operation, the authentication system enables the secure transmission of data from one device to another. For example, a user is able to communicate with another user without worry that a third party is going to intercept and view the contents of the communication. In another example, a device is able to communicate information (e.g., a password, banking information, private information) to another device in a secure manner.

The authentication system includes a network security methodology for preventing unauthorized access, packet tampering, network tapping and eavesdropping, man-in-the-middle and other security attacks. The network infrastructures are agnostic supporting a form of WAN and LAN network architectures.

The design objectives for the authentication system are:

1. High performance, high-scale and high-throughput performance with limited overhead and network delays.

2. Control of hardware or software endpoints that can connect and participate with other network resources. This is achieved by identifying unauthorized network guests and excluding them from communicating within the network.

3. Guarantee endpoint authenticity. Preventing authorized network endpoints from being impersonated or spoofed by malicious systems.

4. Prevention of Man-in-the-Middle and Replay-type attacks.

5. Network architecture agnostic—functional on a broad variety of network protocols and architectures including Ethernet, Internet Protocol, Bluetooth, RF Wireless, 5G cellular, and others.

6. Does not rely on specific hardware types or features, such as network switch or router security extensions. Any network hardware transports are supported including fiber cabling, radio and carrier networks, and all layers of the OSI network stack protocols.

7. Designed for high throughput low latency performance with insignificant hardware overhead.

8. Able to be deployed in very small capacity devices like smartphones, IoT hardware, Bluetooth attach devices as simple as mice and keyboards.

9. Endpoint systems equipped with this technology can be completely isolated from the rest of the network. Incoming connection requests are dropped and not detectable by other network systems.

10. Supports broadcast and multicast network communications.

11. Endpoint to endpoint security (optional advanced secure mode). Prevents network packet tampering where payload data is modified fraudulently. Fully encrypts network packet payload data.

12. Provides fully quantum resistant security solutions.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Disjunctive language, such as the phrase "at least one of X, Y, or Z," unless specifically stated otherwise, is to be understood with the context as used in general to present that an item, term, etc., can be either X, Y, or Z, or any combination thereof (e.g., X, Y, and/or Z). Thus, such disjunctive language is not generally intended to, and should not, imply that certain embodiments require at least one of X, at least one of Y, or at least one of Z to be each present.

It should be emphasized that the above-described embodiments of the present disclosure are merely possible examples of implementations set forth for a clear understanding of the principles of the disclosure. Many variations and modifications can be made to the above-described embodiment(s) without departing substantially from the spirit and principles of the disclosure. All such modifications and variations are intended to be included herein within the scope of this disclosure and protected by the following claims.

What is claimed is:

1. A method programmed in a non-transitory memory of a first device of verifying a digital signature for data, wherein the first device is communicatively coupled to a second device over a network, the method comprising:
   receiving the data, the digital signature, and a public key, from the second device over the network, wherein the public key comprises a first set of singular matrices;
   generating a hash of the data by the first device, wherein the hash comprises a second set of singular matrices; and
   verifying the digital signature by the first device in response to determining that a relation is fulfilled, wherein the relation comprises a combination of a first singular matrix, a matrix and a second singular matrix.

2. The method of claim 1 wherein the relation comprises: $H_n^{(1)}Y_n H_n^{(2)} = Z_n^{(1)} X_n Z_n^{(2)}$, wherein $H_n^{(1)}$ is the first singular matrix, $Y_n$ is the matrix, $H_n^{(2)}$ is the second singular matrix, $Z_n^{(1)}$ is a third singular matrix, $X_n$ is a second matrix, and $Z_n^{(2)}$ is fourth singular matrix.

3. The method of claim 1 further comprising receiving an authentication message for the data from an authentication server.

4. The method of claim 1 further comprising registering the first device for receiving the data.

5. The method of claim 4 wherein registering the first device includes generating an authentication transaction value.

6. The method of claim 4 wherein registering the first device is performed by a protected embedded system.

7. An apparatus for verifying a digital signature for data, wherein the apparatus is communicatively coupled to a second apparatus over a network, the apparatus comprising:
   a non-transitory memory configured for storing an application, the application configured for:
   receiving the data, the digital signature, and a public key, from the second apparatus over the network, wherein the public key comprises a first set of singular matrices;
   generating a hash of the data, wherein the hash comprises a second set of singular matrices; and
   verifying the digital signature in response to determining that a relation is fulfilled, wherein the relation comprises a combination of a first singular matrix, a matrix and a second singular matrix; and
   a processor configured for processing the application.

8. The apparatus of claim 7 wherein the relation comprises: $H_n^{(1)}Y_n H_n^{(2)} = Z_n^{(1)} X_n Z_n^{(2)}$, wherein $H_n^{(1)}$ is the first singular matrix, $Y_n$ is the matrix, $H_n^{(2)}$ is the second singular matrix, $Z_n^{(1)}$ is a third singular matrix, $X_n$ is a second matrix, and $Z_n^{(2)}$ is fourth singular matrix.

9. The apparatus of claim 7 wherein the application is further for receiving an authentication message for the data from an authentication server.

10. The apparatus of claim 7 wherein the application is further for registering the apparatus for receiving the data.

11. The apparatus of claim 10 wherein registering the apparatus includes generating an authentication transaction value.

12. The apparatus of claim 10 wherein registering the apparatus is performed by a protected embedded system.

13. A method programmed in a non-transitory memory of a first device of verifying a digital signature for data, wherein the first device is communicatively coupled to a second device over a network, the method comprising:
   storing a public key on the first device, wherein the public key comprises a first set of singular matrices;
   receiving the data and the digital signature from the second device over the network;
   generating a hash of the data by the first device, wherein the hash comprises a second set of singular matrices; and
   verifying the digital signature by the first device in response to determining that a relation is fulfilled, wherein the relation comprises a combination of a first singular matrix, a matrix and a second singular matrix.

14. The method of claim 13 wherein the relation comprises: $H_n^{(1)}Y_n H_n^{(2)} = Z_n^{(1)} X_n Z_n^{(2)}$, wherein $H_n^{(1)}$ is the first singular matrix, $Y_n$ is the matrix, $H_n^{(2)}$ is the second singular matrix, $Z_n^{(1)}$ is a third singular matrix, $X_n$ is a second matrix, and $Z_n^{(2)}$ is fourth singular matrix.

15. The method of claim 13 further comprising receiving an authentication message for the data from an authentication server.

16. The method of claim 13 further comprising registering a user device for receiving the data.

17. The method of claim 16 wherein registering the user device includes generating an authentication transaction value.

18. The method of claim 16 wherein registering the user device is performed by a protected embedded system.

* * * * *